(12) United States Patent
Chen et al.

(10) Patent No.: US 10,827,103 B2
(45) Date of Patent: Nov. 3, 2020

(54) FIXED-FOCUS CAMERA MODULE AND MANUFACTURING METHOD THEREFOR

(71) Applicant: NINGBO SUNNY OPOTECH CO., LTD., Ningbo (CN)

(72) Inventors: Zhenyu Chen, Ningbo (CN); Mingzhu Wang, Ningbo (CN); Xiaojuan Su, Ningbo (CN); Bojie Zhao, Ningbo (CN)

(73) Assignee: Ningbo Sunny Opotech Co., Ltd. (CN)

( * ) Notice: Subject to any disclaimer, the term of this patent is extended or adjusted under 35 U.S.C. 154(b) by 46 days.

(21) Appl. No.: 16/311,894

(22) PCT Filed: Jun. 23, 2017

(86) PCT No.: PCT/CN2017/089749
§ 371 (c)(1),
(2) Date: Jan. 25, 2019

(87) PCT Pub. No.: WO2018/227343
PCT Pub. Date: Dec. 20, 2018

(65) Prior Publication Data
US 2019/0199896 A1    Jun. 27, 2019

(51) Int. Cl.
| H04N 5/225 | (2006.01) |
| G03B 13/32 | (2006.01) |
| G02B 7/04 | (2006.01) |
| H04N 5/44 | (2011.01) |

(52) U.S. Cl.
CPC ............. *H04N 5/2253* (2013.01); *G02B 7/04* (2013.01); *G03B 13/32* (2013.01); *H04N 5/2254* (2013.01); *H04N 5/44* (2013.01)

(58) Field of Classification Search
CPC ...... H04N 5/2253; H04N 5/2254; H04N 5/44; G03B 13/32; G03B 2217/002;
(Continued)

(56) References Cited

U.S. PATENT DOCUMENTS 8,891,007 B2    11/2014  Pavithran et al.
9,088,705 B1 *   7/2015  Tam .................... H04N 5/2253
(Continued)

FOREIGN PATENT DOCUMENTS

| CN | 1912663 A | 2/2007 |
| CN | 101149458 A | 3/2008 |

(Continued)

OTHER PUBLICATIONS

PCT International Search Report and Written Opinion completed by the ISA/CN dated Aug. 4, 2017 and issued in connection with PCT/CN2017/089749.

*Primary Examiner* — Twyler L Haskins
*Assistant Examiner* — Angel L Garces-Rivera
(74) *Attorney, Agent, or Firm* — Barnes & Thornburg LLP

(57) ABSTRACT

The present invention provides a fixed-focus camera module and a manufacturing method therefor. The fixed-focus camera module comprises a light-sensitive chip, an optical lens assembly, and a lens base. The optical lens assembly is directed packaged in the lens base, and the optical lens assembly is kept in a light-sensitive path of the light-sensitive chip. In this manner, the size and the manufacturing costs of the fixed-focus camera module can be effectively reduced, so as to improve the product competitiveness of the fixed-focus camera module.

20 Claims, 12 Drawing Sheets

(58) Field of Classification Search
CPC .......... G03B 19/00; G02B 7/04; G02B 7/006; G02B 7/022; G02B 7/025
See application file for complete search history.

(56) References Cited

U.S. PATENT DOCUMENTS

| | | |
|---|---|---|
| 2006/0093352 A1 | 5/2006 | Webster et al. |
| 2006/0215055 A1 | 9/2006 | Yoon |
| 2008/0100934 A1 | 5/2008 | Webster et al. |
| 2012/0229701 A1 | 9/2012 | Pavithran et al. |
| 2015/0138436 A1 | 5/2015 | Wong |

FOREIGN PATENT DOCUMENTS

| | | |
|---|---|---|
| CN | 102998765 A | 3/2013 |
| CN | 103246039 A | 8/2013 |
| CN | 105445885 A | 3/2016 |
| CN | 105487191 A | 4/2016 |
| CN | 205792938 U | 12/2016 |
| CN | 205809504 U | 12/2016 |
| JP | 2005020464 A | 1/2005 |
| JP | 2006270926 A | 10/2006 |
| JP | 2007036393 A | 2/2007 |
| JP | 2007274230 A | 10/2007 |
| JP | 2008129180 A | 6/2008 |
| JP | 2009060380 A | 3/2009 |
| JP | 2009512346 A | 3/2009 |
| JP | 4269947 B2 | 5/2009 |
| JP | 2010040662 A | 2/2010 |
| JP | 2015099262 A | 5/2015 |
| KR | 20070012185 A | 1/2007 |
| KR | 20130124672 A | 11/2013 |
| WO | 2015025742 A1 | 3/2017 |

\* cited by examiner

FIXED-FOCUS CAMERA MODULE AND MANUFACTURING METHOD THEREFOR

CROSS-REFERENCE TO RELATED APPLICATIONS

This application is a U.S. national counterpart application of international application serial No. PCT/CN2017/089749, filed Jun. 23, 2017, which claims priority to Chinese Patent Application Nos. 201610480992.1, 201620650844.5, 201610487305.9, and 201620638177.9, all filed Jun. 23, 2016. The disclosures of PCT/CN2017/089749, Chinese Patent Application Nos. 201610480992.1, 201620650844.5, 201610487305.9, and 201620638177.9 are incorporated by reference in their entireties.

TECHNICAL FIELD

The present disclosure relates to the field of optical imaging, in particular to a fixed-focus camera module and a manufacturing method therefor.

BACKGROUND

With the rapid development of science and technology by leaps and bounds and the continuous improvement of people's economic status, portable electronic devices such as smart phones and tablet computers and related technologies have developed rapidly. Camera modules for helping users to shoot images have become one of the standard configurations of the portable electronic devices. Typically, the portable electronic device is configured with a front camera module, in order to facilitate the user to take a selfie or make a video call using the portable electronic device. Since there is no need to reserve space for focusing once a fixed-focus camera module is configured in the portable electronic device, in order to control the size of a portable electronic device, the fixed-focus camera module becomes the first choice for the front camera module of the portable electronic device.

In recent years, portable electronic devices have become more and more intelligent, light and thin. This development trend of the portable electronic devices requires, on the one hand, to add smart components to make the portable electronic devices have more powerful functions, on the other hand, to reduce the sizes of the various components of a portable electronic device to control the sizes of the portable electronic device. This development trend of the portable electronic devices places demanding requirements on, in particular, the size of the fixed-focus camera module. Although there is no need to reserve space for focusing after the fixed-focus camera module is configured in the portable electronic device, the fixed-focus camera module still needs to be focused in the process of packaging to ensure the imaging quality of the fixed-focus camera module.

FIG. 1 is a prior art fixed-focus camera module including a photosensing component 10P, an optical lens assembly 20P, and a base 3P, where the base 3P includes a base body 33P and a lens barrel 34P. The lens barrel 34P integrally extends to the base body 33P, where the photosensing component 10P is disposed on the base body 33P, and the optical lens assembly 20P is disposed on the lens barrel 34P to make the optical lens assembly 20P locate in the photosensing path of the photosensing component 10P. In the fixed-focus photographing module of prior art, the optical lens assembly 20P is fixed and held in a focused position by the lens barrel 34P. The arrangement of the lens barrel 34P limits the size of the fixed-focus camera module, and even becomes a technical bottleneck restricting the development of the fixed-focus camera module. In addition, since the optical lens assembly 20P is mounted inside the lens barrel 34P, in the process of mounting the optical lens assembly 20P and the lens barrel 34P or adjusting the position of the optical lens assembly 20P relative to the lens barrel 34P to focus the fixed-focus camera module, some contaminants such as particles are generated on the outer surface of the optical lens assembly 20P and the inner surface of the lens barrel 34P due to mutual friction of the outer surface of the optical lens assembly 20P and the inner surface of the lens barrel 34P, and these contaminants such as particles may be retained at the interior of the fixed-focus camera module. Even after the fixed-focus camera module is packaged, it is impossible to take out these contaminants such as particles. As time goes by and the external shocks experienced by the fixed-focus camera module, some contaminants such as particles may enter the optical path of the optical lens assembly 20P and may be imaged on the photosensing component 10P, thereby causing the occurrence of stained points and lowering the imaging quality of the fixed-focus camera module.

SUMMARY

An objective of the present disclosure is to provide a fixed-focus camera module and a manufacturing method thereof, where the size of the fixed-focus camera module can be effectively reduced, so that the fixed-focus camera module is particularly suitable for being applied to the electronic devices that seek to be light and thin.

An objective of the present disclosure is to provide a fixed-focus camera module and a manufacturing method thereof, where the optical lens assembly of the fixed-focus camera module is directly packaged in the lens base, so that the fixed-focus camera module does not need to provide a lens barrel to fix the optical lens assembly and the lens base, that is, there is no need to provide a lens barrel around the optical lens assembly, so that the head size of the fixed-focus camera module can be reduced.

An objective of the present disclosure is to provide a fixed-focus camera module and a manufacturing method thereof, where the optical lens assembly is directly packaged in the lens base to effectively reduce the height dimension of the camera module.

An objective of the present disclosure is to provide a fixed-focus camera module and a manufacturing method thereof, where a glue layer is provided or formed between the optical lens assembly and the lens base for packaging the optical lens assembly in the lens base.

An objective of the present disclosure is to provide a fixed-focus camera module and a manufacturing method thereof, where the glue layer is used to seal a gap between the optical lens assembly and the lens base, to prevent external light or contaminants from entering the interior of the fixed-focus camera module through the gap, to ensure the imaging quality of the fixed-focus camera module.

An objective of the present disclosure is to provide a fixed-focus camera module and a manufacturing method thereof, where the glue layer is used to improve the flatness of the optical lens assembly and the lens base, such that the central axis of the optical lens assembly coincides with the central axis of the lens base, to ensure the imaging quality of the fixed-focus camera module.

An objective of the present disclosure is to provide a fixed-focus camera module and a manufacturing method thereof, where in the process of packaging the fixed-focus camera module, the position of the optical lens assembly relative to the photosensing component is adjusted for the exterior of the fixed-focus camera module, therefore, the contaminants such as solid particles generated when focusing the fixed-focus camera module can not enter the interior of the camera module, to improve the imaging quality of the fixed-focus camera module.

An objective of the present disclosure is to provide a fixed-focus camera module and a manufacturing method thereof, where the glue layer disposed or formed between the optical lens assembly and the lens base can prevent the contaminants such as solid particles generated during focusing the fixed-focus camera module from entering the interior of the fixed-focus camera module.

An objective of the present disclosure is to provide a fixed-focus camera module and a manufacturing method thereof, where after the fixed-focus camera module is packaged, the contaminants such as solid particles mounted to the outside of the fixed-focus camera module can be removed by washing the fixed-focus camera module.

An objective of the present disclosure is to provide a fixed-focus camera module and a manufacturing method thereof, where the fixed-focus camera module does not need to provide a lens barrel. In this way, the product material cost and technical difficulty of the fixed-focus camera module can be reduced, to improve the product competitiveness of the fixed-focus camera module.

An objective of the present disclosure is to provide a fixed-focus camera module and a manufacturing method thereof, where the lens base provides an inner groove for accommodating an optical filtering element, thereby reducing the height of the fixed-focus camera module.

An objective of the present disclosure is to provide a fixed-focus camera module and a manufacturing method thereof, where the lens base provides an outer groove for packaging the optical lens assembly, thereby reducing the height of the fixed-focus camera module.

An objective of the present disclosure is to provide a fixed-focus camera module and a manufacturing method thereof, where the fixed-focus camera module includes a photosensing assembly and the lens assembly, and the lens is directly mounted on the photosensing assembly instead of being mounted through the lens barrel.

An objective of the present disclosure is to provide a fixed-focus camera module and a manufacturing method thereof, where the photosensing assembly includes an integrated base and a circuit board, the integrated base is integrally formed on the circuit board, and the lens assembly is directly disposed at the integrated base.

An objective of the present disclosure is to provide a fixed-focus camera module and a manufacturing method thereof, where the integrated base is integrally formed on the circuit board and at least a portion of the photosensing component.

An objective of the present disclosure is to provide a fixed-focus camera module and a manufacturing method thereof, where the photosensing assembly includes a support, the support is disposed at the integrated base, and the optical filtering element is mounted to the support.

An objective of the present disclosure is to provide a fixed-focus camera module and a manufacturing method thereof, where the optical lens assembly includes at least two group units, and at least one of the group units is directly disposed at the lens base.

An objective of the present disclosure is to provide a fixed-focus camera module and a manufacturing method thereof, where at least one of the group units is directly mounted to the integrated base.

An objective of the present disclosure is to provide a fixed-focus camera module and a manufacturing method thereof, where the respective group units are exposed to the exterior of the lens base or the integrated base, for being adjusted and operated conveniently.

An objective of the present disclosure is to provide a fixed-focus camera module and a manufacturing method thereof, where the respective group units are exposed to the exterior of the lens base or the integrated base, so that each of the group units may be adjusted, and the adjustable range is wider, instead of being limited to adjusting the group unit at the top.

An objective of the present disclosure is to provide a fixed-focus camera module and a manufacturing method thereof, where the fixed-focus camera module is formed by adjusting a plurality of group units, to reduce the lens accumulated error of the lens assembly, and is suitable for manufacturing a multi-lens assembly fixed-focus camera module.

According to the present disclosure, a fixed-focus camera module capable of achieving the foregoing and other objectives and advantages includes:
a photosensing component;
an optical lens assembly; and
a lens base, where the optical lens assembly is packaged at a top end of the lens base such that the optical lens assembly protrudes outwardly from the lens base, and the optical lens assembly is held in a photosensing path of the photosensing component.

According to another aspect of the present disclosure, the present disclosure provides a method for manufacturing a fixed-focus camera module, where the manufacturing method includes the steps of: packaging an optical lens assembly at a top end of a lens base such that the optical lens assembly protrudes outwardly from the lens base, and holding the optical lens assembly in a photosensing path of a photosensing component mounted to a circuit board, thereby forming the fixed-focus camera module.

The fixed-focus camera module of the present disclosure includes the photosensing component, the optical lens assembly and the lens base. The photosensing component is disposed at one side of the lens base, the optical lens assembly is directly packaged at the other side of the lens base, and the optical lens assembly is held in the photosensing path of the photosensing component. Light reflected by an object can enter the interior of the fixed-focus camera module from the optical lens assembly, and to be received and photoelectrically converted by the photosensing component, to generate an image (e.g., image or video) associated with the object. That is, no member need to be provided around the optical lens assembly of the fixed-focus camera module of the present disclosure, so that the size of the fixed-focus camera module can be reduced by reducing the head size of the fixed-focus camera module. When the fixed-focus camera module is applied to an electronic device, the reduction in the size of the fixed-focus camera module can leave more space for other components and parts of the electronic device, therefore, the electronic device can conform to the development trend of being intelligent, light and thin.

According to another aspect of the present disclosure, a fixed-focus camera module is provided, fixed—the focus camera module includes:
a photosensing assembly; and
an optical lens assembly;

where the optical lens assembly is directly packaged at the photosensing assembly to form the fixed-focus camera module.

DETAILED DESCRIPTION OF EMBODIMENTS

The following description is provided to disclose the present disclosure to enable those skilled in the art to implement the present disclosure. Preferred embodiments are provided in the following description only as examples and modifications will be apparent to those skilled in the art. The general principles of the present disclosure defined in the following description may be applied to other embodiments, alternatives, modifications, equivalents, and other technical solutions without departing from the spirit and scope of the present disclosure.

Figure 1:
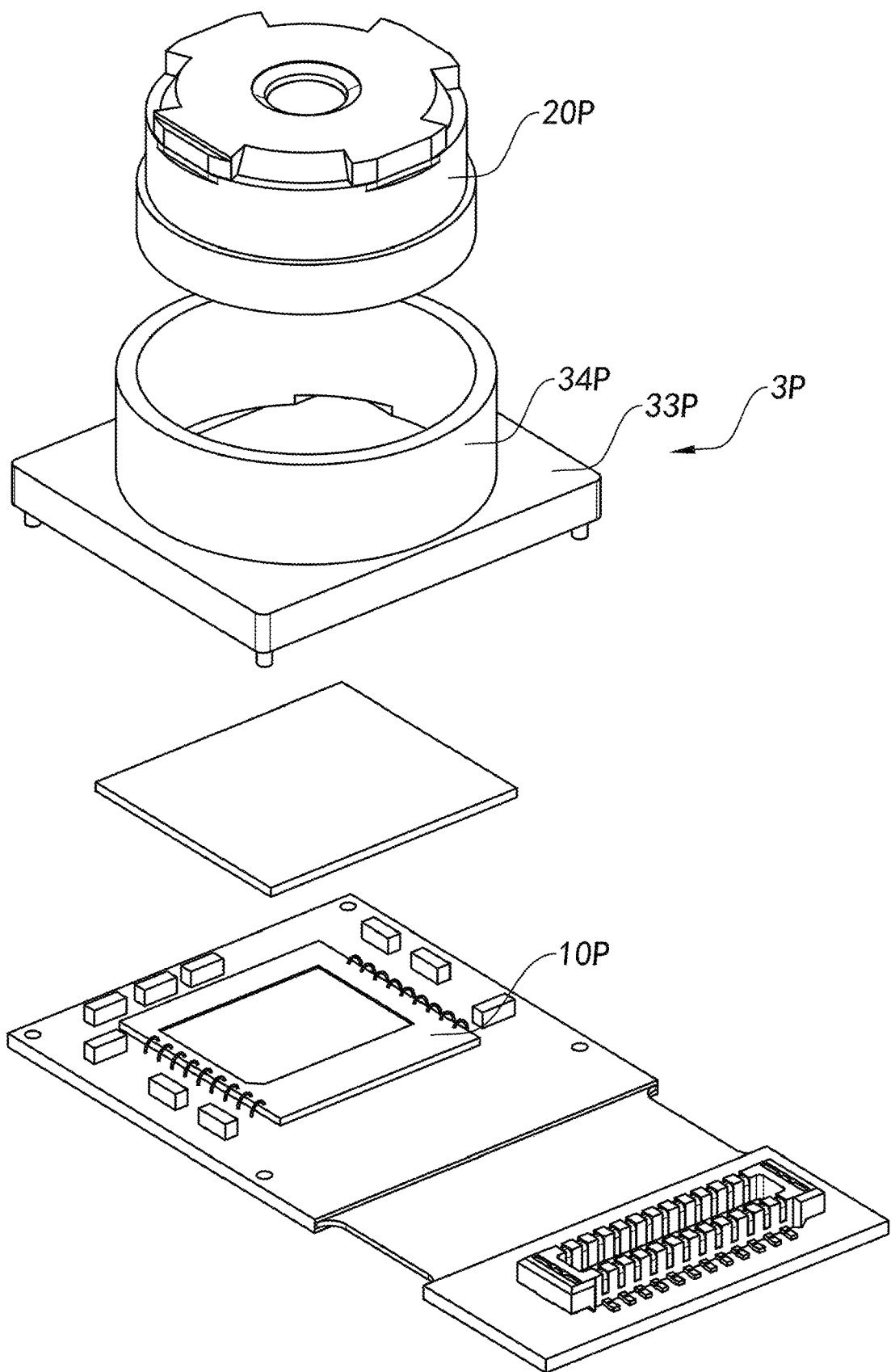
FIG. 1 is an exploded schematic diagram of the prior art.
Figure 2:
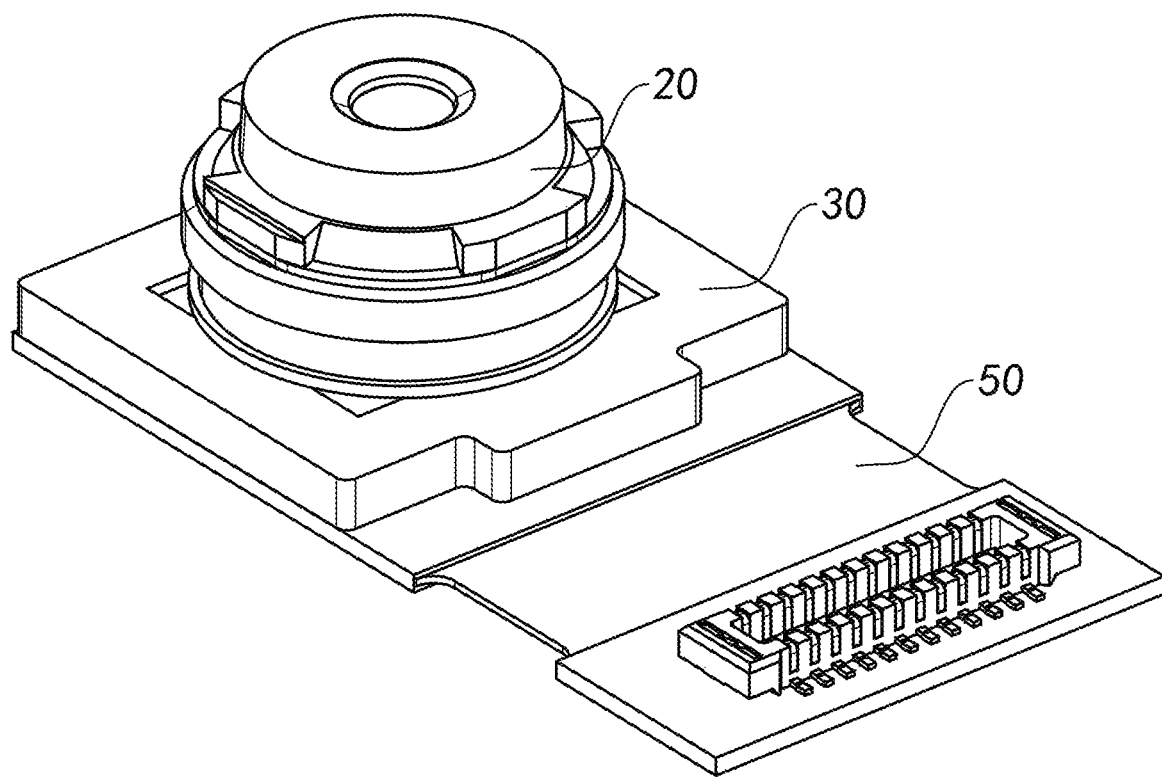
FIG. 2 is a three-dimensional schematic diagram of a fixed-focus camera module according to a preferred embodiment of the present disclosure.
Figure 3:
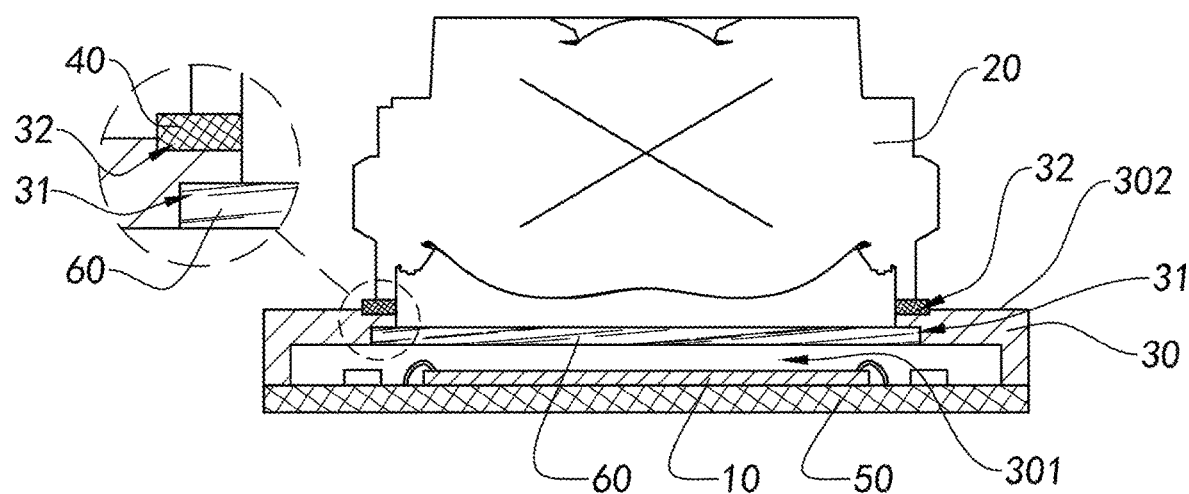
FIG. 3 is a cross-sectional schematic diagram of the fixed-focus camera module according to the above preferred embodiment of the present disclosure.

Referring to FIG. 2 and FIG. 3 of the accompanying drawings of the present disclosure, a fixed-focus camera module according to a preferred embodiment of the present disclosure is illustrated. Here, the fixed-focus camera module includes a photosensing component 10, an optical lens assembly 20 and a lens base 30. Here, the optical lens assembly 20 is directly packaged at the top end 302 of the lens base 30, an aperture 301 is formed in the center of the lens base 30, and the optical lens assembly 20 is held in the photosensing path of the photosensing component 10. Light reflected by an object can enter the interior of the fixed-focus camera module from the optical lens assembly 20 and be received and photoelectrically converted by the photosensing component 10, to generate an image (e.g., image or video) associated with the object.

It is worth mentioning that in the fixed-focus camera module of the present disclosure, the type of the photosensing component 10 and the type of the optical lens assembly 20 are not limited. For example, in an exemplary description, the photosensing component 10 may be a Charge Coupled Device (CCD), or the photosensing component 10 may be a Complementary Metal-Oxide Semiconductor (CMOS). Alternatively, the photosensing component 10 may be a silicon photonics chip. That is, in the fixed-focus camera module of the present disclosure, the photosensing component 10 refers to any optical element capable of realizing photoelectric conversion after receiving light reflected by an object. Correspondingly, the optical lens assembly 20 refers to any optical element capable of allowing the light reflected by an object to enter the interior from the exterior of the fixed-focus camera module and improving the quality of the light.

In the fixed-focus camera module of the present disclosure, the optical lens assembly 20 is directly packaged at the top end 302 of the lens base 30. That is to say, the fixed-focus camera module of the present disclosure does not need to provide the lens barrel structure in the prior art, and in this way, the volume of the fixed-focus camera module around the optical lens assembly 20 can be reduced, so that when the fixed-focus camera module is mounted to an electronic device, the fixed-focus camera module can occupy the space of the electronic device as little as possible, thereby enabling the electronic device to leave more space for the installation of other components and parts. In a specific example, a space of at least 0.2 mm can be saved in any direction around the optical lens assembly 20, that is, the head of the fixed-focus camera module (i.e., the optical lens assembly 20 and the surrounding area) can save a space of at least 0.4 mm, which is of great significance for the fixed-focus camera module to be applied to electronic devices that are intelligent, light and thin.

In addition, the fixed-focus camera module of the present disclosure does not need to provide the lens barrel structure in the prior art, but directly packages the optical lens assembly 20 at the lens base 30, in this way, the material used can be reduced to reduce the cost of the fixed-focus camera module, thereby improving the product competitiveness of the fixed-focus camera module.

In the process of packaging the fixed-focus camera module of the present disclosure, by means of that a focusing mechanism holds, at the exterior of the optical lens assembly 20, the optical lens assembly 20, the position of the optical lens assembly 20 relative to the photosensing component 10 is adjusted to improve the imaging quality of the fixed-focus camera module. Therefore, in this process, even if the focusing mechanism causes the optical lens assembly 20 to generate contaminants such as solid particles, the contaminants such as solid particles can not enter the interior of the fixed-focus camera module, which prevents stains caused by the contaminants such as solid particles, thereby ensuring the imaging quality of the fixed-focus camera module. After the contaminants such as solid particles are generated, the contaminants such as solid particles may adhere to the outer surface of the fixed-focus camera module at most, and after the fixed-focus camera module is packaged, the contaminants such as solid particles that adhere to the outer surface of the fixed-focus camera module can be removed by cleaning, which ensures the imaging quality of the fixed-focus camera module during use when configured in the electronic device.

It is worth mentioning that the focusing mechanism may be either a focusing apparatus in vertical direction or a focusing apparatus in multi-direction, such as an proactive focusing apparatus in horizontal, vertical and inclined directions.

Further, as shown in FIG. 3, the fixed-focus camera module includes a glue layer 40, where the glue layer 40 is located between the optical lens assembly 20 and the lens base 30 for directly packaging the optical lens assembly 20 in the lens base 30. Correspondingly, the glue layer 40 is in annular shape, to connect the annular outer edge of the optical lens assembly 20 with the lens base 30. Preferably, the glue layer 40 is formed from an opaque material. It is worth mentioning that the glue layer 40 can not only connect the optical lens assembly 20 and the lens base 30, but also be used to seal the joint generated between the optical lens assembly 20 and the lens base 30, to prevent the contaminants such as solid particles or external contaminants or external light from entering the interior of the fixed-focus camera module from the exterior of the fixed-focus camera module through the joint between the optical lens assembly 20 and the lens base 30, thus ensuring the imaging quality of the fixed-focus camera module.

The glue layer 40 is formed at the joint of the optical lens assembly 20 and the lens base 30. Specifically, the dispensing is selectively performed at a corresponding position of at least one of the optical lens assembly 20 and the lens base 30. After the dispensing operation is completed, the lower end surface of the optical lens assembly 20 is mounted to the lens base 30 for disposing the glue between the optical lens assembly 20 and the lens base 30, and focusing the fixed-focus camera module. When focusing, the optical lens assembly 20 may be held from the exterior of the optical lens assembly 20. After the focusing is completed, the glue is cured to form the glue layer 40 between the optical lens assembly 20 and the lens base 30. Preferably, dispensing may be performed only at the corresponding position of the lens base 30, to prevent glue from contaminating the optical lens assembly 20. More preferably, the glue may be cured by irradiation of ultraviolet light (Ultraviolet Rays), i.e., UV glue may be used for the glue layer 40. It may be understood by those skilled in the art that other suitable glues may also be used and the glue may be cured by other means, such as thermal curing.

It is worth mentioning that after the dispensing operation is completed at the corresponding position of the lens base 30, the glue may be semi-cured to prevent the glue from contaminating the optical lens assembly 20 in the process of packaging the optical lens assembly 20 in the lens base 30. In other words, after the glue is applied to the lens base 30 by dispensing, the glue may be semi-cured to make the semi-cured glue have viscosity and plasticity. After the lower end surface of the optical lens assembly 20 is mounted to the lens base 30 and the focusing of the fixed-focus camera module is completed, the glue is cured to form the glue layer 40 between the optical lens assembly 20 and the lens base 30. On the one hand, the glue layer 40 keeps the optical lens assembly 20 in a focused position, and on the other hand, the glue layer 40 seals the joint between the optical lens assembly 20 and the lens base 30. It is also possible to completely cure, without a semi-cured state being experienced, the glue after the focusing operation to form the glue layer 40.

In the process of packaging the fixed-focus camera module of the present disclosure, the glue layer 40 can improve the alignment of the optical lens assembly 20 and the lens base 30, so that the central axis of the optical lens assembly 20 can coincide with the central axis of the photosensing component 10 to improve the imaging quality of the fixed-focus camera module. That is, the glue layer 40 can compensate for the product error of the optical lens assembly 20, the product error of the lens base 30 and the mounting errors of the optical lens assembly 20 and the lens base 30, thereby improving the imaging quality of the fixed-focus camera module.

Referring to FIG. 2 and FIG. 3, the fixed-focus camera module further includes a circuit board 50, where the photosensing component 10 is mounted to the circuit board 50, and the circuit board 50 is connected with the lens base 30, so that the positions of the optical lens assembly 20 and the photosensing component 10 correspond to each other. Preferably, the circuit board 50 may be a PCB circuit board (Printed Circuit Board), and after the photosensing component 10 is mounted to the circuit board 50, the circuit board 50 can maintain the flatness of the photosensing component 10. Nevertheless, those skilled in the art may understand that the circuit board 50 may also be any structure capable of connecting the photosensing component 10 and other elements of the electronic device, for example, the circuit board 50 may be an FPC circuit board (Flexible Printed Circuit). Specifically, the circuit board 50 implemented as an FPC circuit board may be mounted to a reinforcing member (for example, a metal reinforcing member), and then the photosensing component 10 is mounted to the reinforcing member, and the photosensing component 10 is connected to the circuit board 50 to ensure the flatness of the photosensing component 10 by the reinforcing member. The lens base 30 may be mounted to the circuit board 50, or may be integrally packaged at the circuit board 50. That is, the lens base 30 may be implemented as the integrated base 3000 proposed subsequently.

In the fixed-focus camera module of the present disclosure, the photosensing component 10 may be first fixed to the circuit board 50, and then the photosensing component 10 is connected to the circuit board 50 by a wire bonding process, for example, a gold wire bonding process, so that the photosensing component 10 is mounted to the circuit board 50. It may be understood that the connection of the photosensing component 10 and the circuit board 50 by way of wire bonding is only an exemplary description. In other examples, the photosensing component 10 may provide one or more chip pads. The circuit board 50 may provide one or more circuit board pads. The mountment of the photosensing component 10 and the circuit board 50 can also be achieved by soldering the chip pad of the photosensing component 10 and the circuit board pad of the circuit board 50. The photosensing component 10 may be mounted to the circuit board 50 by a COB (Chip on Board) method or assembled at the circuit board 50 by an FC (Flip Chip) flip method.

In addition, the fixed-focus camera module further includes an optical filtering element 60, where the optical filtering element 60 is disposed between the photosensing component 10 and the optical lens assembly 20 for improving the imaging quality of the fixed-focus camera module. Light reflected by an object enters the interior of the fixed-focus camera module from the optical lens assembly 20, and is further received and photoelectrically converted by the photosensing component 10 after being filtered by the optical filtering element 60 to generate an image associated with the object. That is, the optical filtering element 60 can filter the stray light in the light reflected by the object that enter from the optical lens assembly 20 into the interior of the fixed-focus camera module to improve the imaging quality of the fixed-focus camera module.

It is worth mentioning that the type of the optical filtering element 60 is not limited. For example, in one example of the present disclosure, the optical filtering element 60 may be an infrared cut-off filter to filter infrared light in the light reflected by the object entering the interior of the fixed-focus camera module. In another example of the present disclosure, the optical filtering element 60 may also be a visible light cut-off filter. In addition, the optical filtering element 60 may also be adjusted, for example, the optical filtering element 60 may be movably disposed on the lens base 30, to make the fixed-focus camera module be applied to different service environments by changing the position of the optical filtering element 60.

Referring to FIG. 3, the optical filtering element 60 is packaged inside the lens base 30 such that the optical filtering element 60 is held between the optical lens assembly 20 and the photosensing component 10. For example, first the optical filtering element 60 may be packaged inside the lens base 30, and then the circuit board 50 may be packaged in the lens base 30. In another modified embodiment, it is also possible to assemble the optical filtering element 60 to the optical lens assembly 20.

Referring to FIG. 3, the interior of the lens base 30 is provided with an inner groove 31, where the optical filtering element 60 is packaged in the inner groove 31 of the lens base 30. In this way, the height of the fixed-focus camera module can be effectively reduced, so that the fixed-focus camera module is particularly suitable for being applied to the electronic devices that seek to be light and thin. In addition, an outer groove 32 is provided on the outside of the lens base 30. In one example, the optical lens assembly 20 is directly packaged in the outer groove 32 of the lens base 30 through the glue layer 40. In another example, only the glue layer 40 may be positioned in the outer groove 32 of the lens base 30. In this way, the height of the fixed-focus camera module can be further effectively reduced, so that the fixed-focus camera module is particularly suitable for being applied to the electronic devices that seek to be light and thin. That is, the outer side and the inner side of the top end 302 of the lens base 30 have the outer groove 32 and the inner groove 31, respectively, for bearing the glue layer 40 and the optical filtering element 60, respectively. It may be understood that in another modified embodiment, the top end 302 of the lens base 30 may also be a flat surface without the concave grooves mentioned above, and the glue layer 40 is respectively arranged on the opposite outer and inner surfaces of the top end 302 of the lens base 30.

In the process of packaging the fixed-focus camera module in this embodiment of the present disclosure, step 1, the circuit board 50 and the photosensing component 10 may be first fixed together, and the circuit board 50 and the photosensing component 10 are electrically connected through the wire bonding process, to conduct the photosensing component 10 with the circuit board 50.

Step 2, the optical filtering element 60 is packaged at the lens base 30. For example, in the example shown in FIG. 3 of the present disclosure, the optical filtering element 60 may be packaged in the inner groove 31 of the lens base 30. It may be understood by those skilled in the art that in the process of packaging the fixed-focus camera module according to the present disclosure, there may be no sequence between the steps 1 and 2 or the steps 1 and 2 may be carried out simultaneously.

Step 3, the circuit board 50 and the lens base 30 are assembled with each other, so that the optical filtering element 60 corresponds to the photosensing component 10 mounted to the circuit board 50.

Step 4, dispensing is performed on the corresponding position of the lens base 30. It is worth mentioning that the amount of glue may be provided as needed, such as the amount of glue is required to ensure the contact to the lower end surface of the optical lens assembly 20. It is worth mentioning that the amount of glue depends on its properties and coating area.

Step 5, the optical lens assembly 20 is mounted to the lens base 30, so that glue is located between the optical lens assembly 20 and the lens base 30, and the optical lens assembly 20 is guaranteed to be in the photosensing path of the photosensing component 10.

Step 6, the position of the optical lens assembly 20 relative to the photosensing component 10 is adjusted to focus the fixed-focus camera module. Specifically, the photosensing component 10 is powered by the circuit board 50 so that the photosensing component 10 can output an image, and the fixed-focus camera module is focused according to the clarity of the image. The method of focusing the fixed-focus camera module may be that the focusing mechanism adjusts the position of the optical lens assembly 20 relative to the photosensing component 10 by holding the external surface of the optical lens assembly 20. Since the fixed-focus camera module of the present disclosure focuses the fixed-focus camera module from the exterior of the fixed-focus camera module, even if the focusing mechanism causes the solid particle contaminants generated on the outer surface of the optical lens assembly 20, the solid particle contaminants do not enter the interior of the fixed-focus camera module, to improve the imaging quality of the fixed-focus camera module. It is worth mentioning that during the focusing operation on the fixed-focus camera module of the present disclosure, although the focal length of the fixed-focus camera module can be adjusted by adjusting the position of the optical lens assembly 20 relative to the photosensing component 10, in other examples, the position of the photosensing component 10 relative to the optical lens assembly 20 may also be adjusted by moving the lens base 30 or the circuit board 50 or the photosensing assembly as a whole.

Step 7, glue is cured to form the glue layer 40 between the optical lens assembly 20 and the lens base 30. It may be understood that, on the one hand, the glue layer 40 can be used to connect the optical lens assembly 20 and the lens base 30, so that the optical lens assembly 20 can be kept in the photosensing path of the photosensing component 10. On the other hand, the glue layer 40 can prevent external contaminants from entering the interior from the exterior of the fixed-focus camera module through the joint of the optical lens assembly 20 and the lens base 30. On the another hand, the glue layer 40 can prevent the external light from entering the interior from the exterior of the fixed-focus camera module through the joint of the optical lens assembly 20 and the lens base 30. In addition, the glue layer 40 can also compensate for the product error of the optical lens assembly 20, the product error of the lens base 30 and the mounting errors of the optical lens assembly 20 and the lens base 30, to prevent the relative inclination between the optical lens assembly 20 and the photosensing component 10, thereby improving the imaging quality of the fixed-focus camera module.

Figure 4:
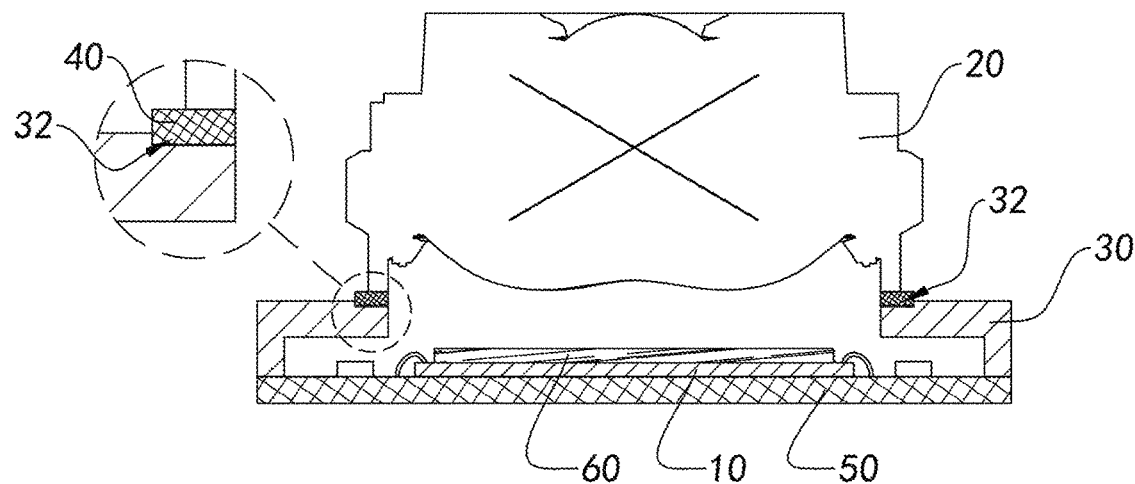
FIG. 4 is a cross-sectional schematic diagram of a modified embodiment of the fixed-focus camera module according to the above preferred embodiment of the present disclosure.
Figure 12:
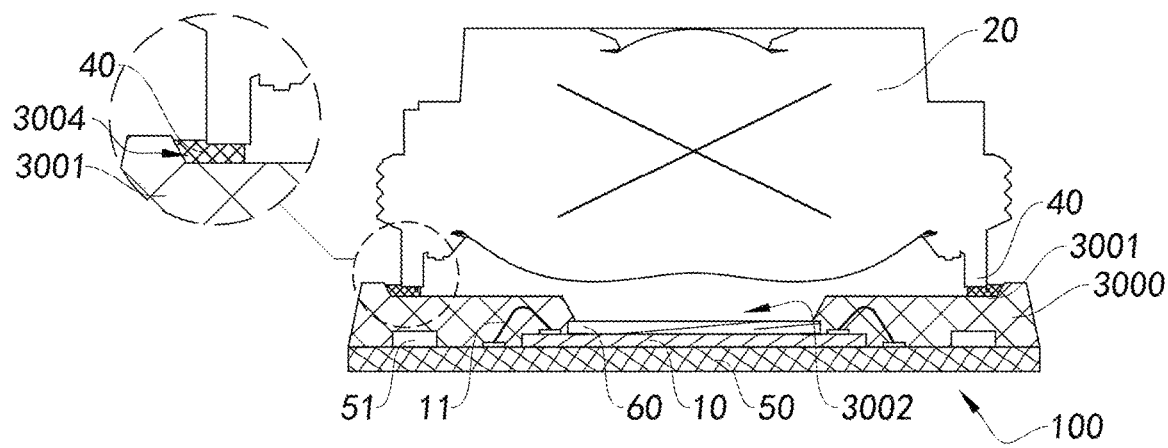
FIG. 12 is a cross-sectional schematic diagram of a modified embodiment of the fixed-focus camera module according to the fourth preferred embodiment of the present disclosure.
Figure 13:
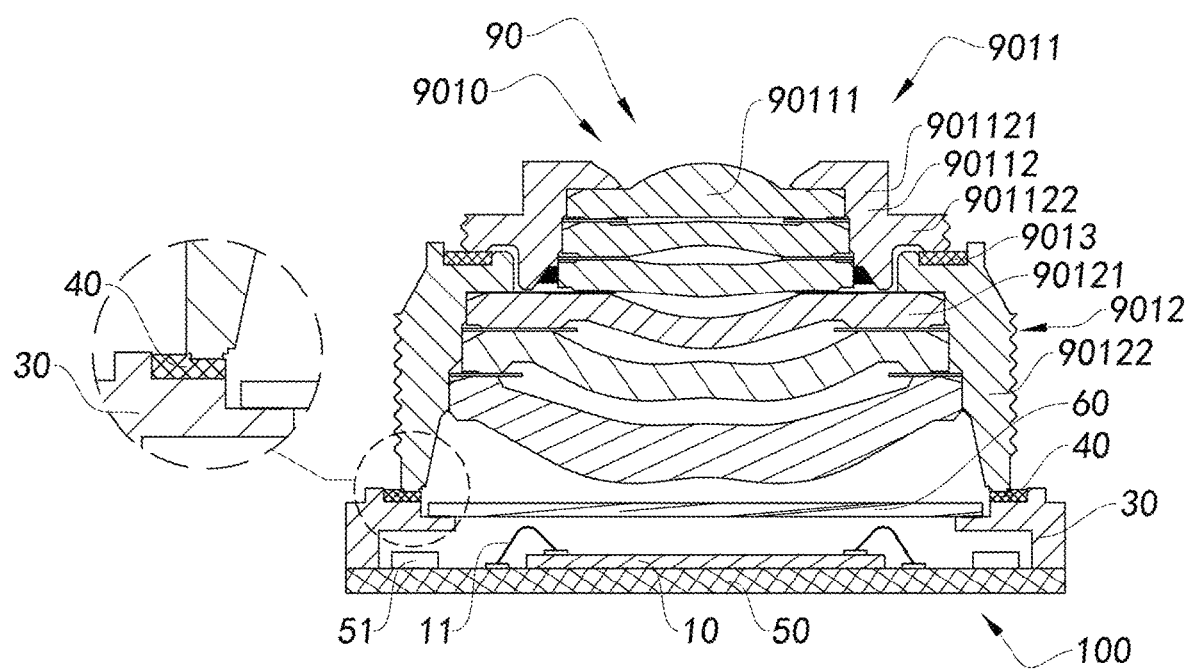
FIG. 13 is a cross-sectional schematic diagram of a fixed-focus camera module according to a fifth preferred embodiment of the present disclosure.
Figure 14:
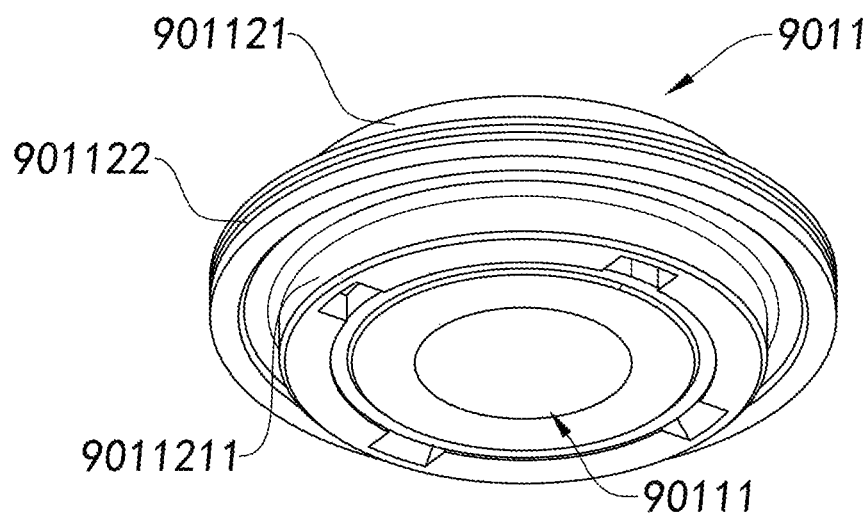
FIG. 14 is a schematic diagram of an upper group unit of a multi-group lens assembly of the fixed-focus camera module according to the fifth preferred embodiment of the present disclosure.
Figure 15:
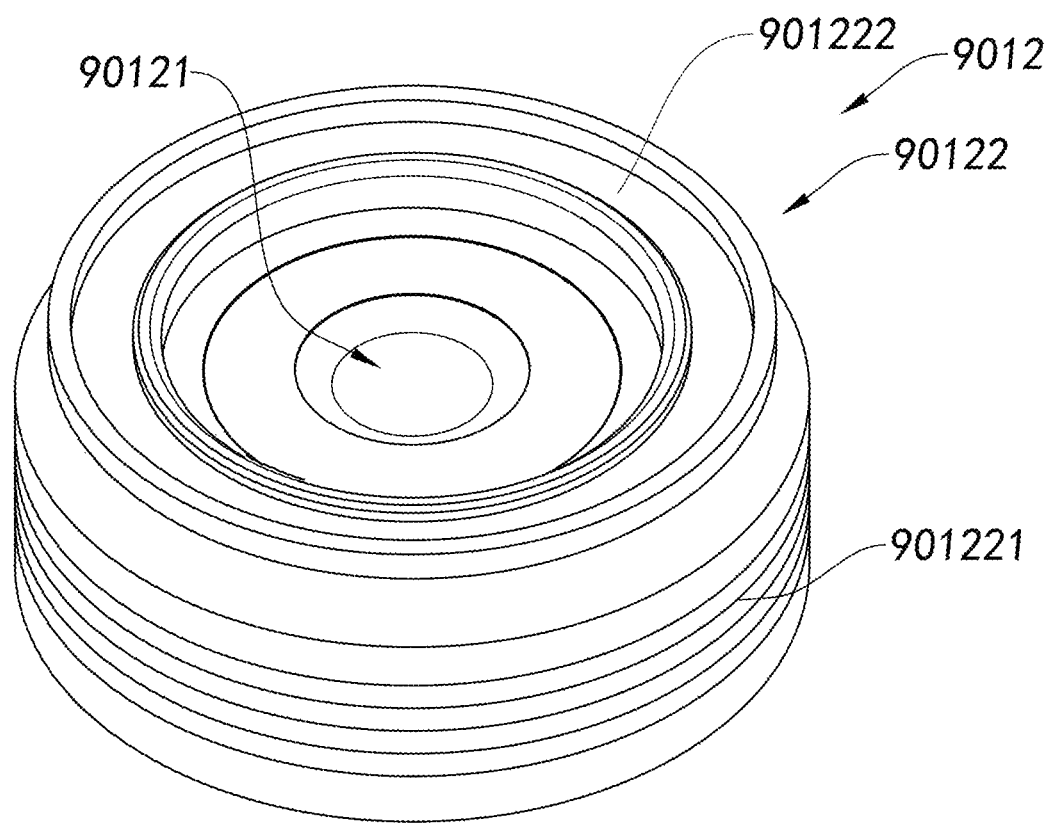
FIG. 15 is a schematic diagram of a lower group unit of the multi-group lens assembly of the fixed-focus camera module according to the fifth preferred embodiment of the present disclosure.
Figure 16:
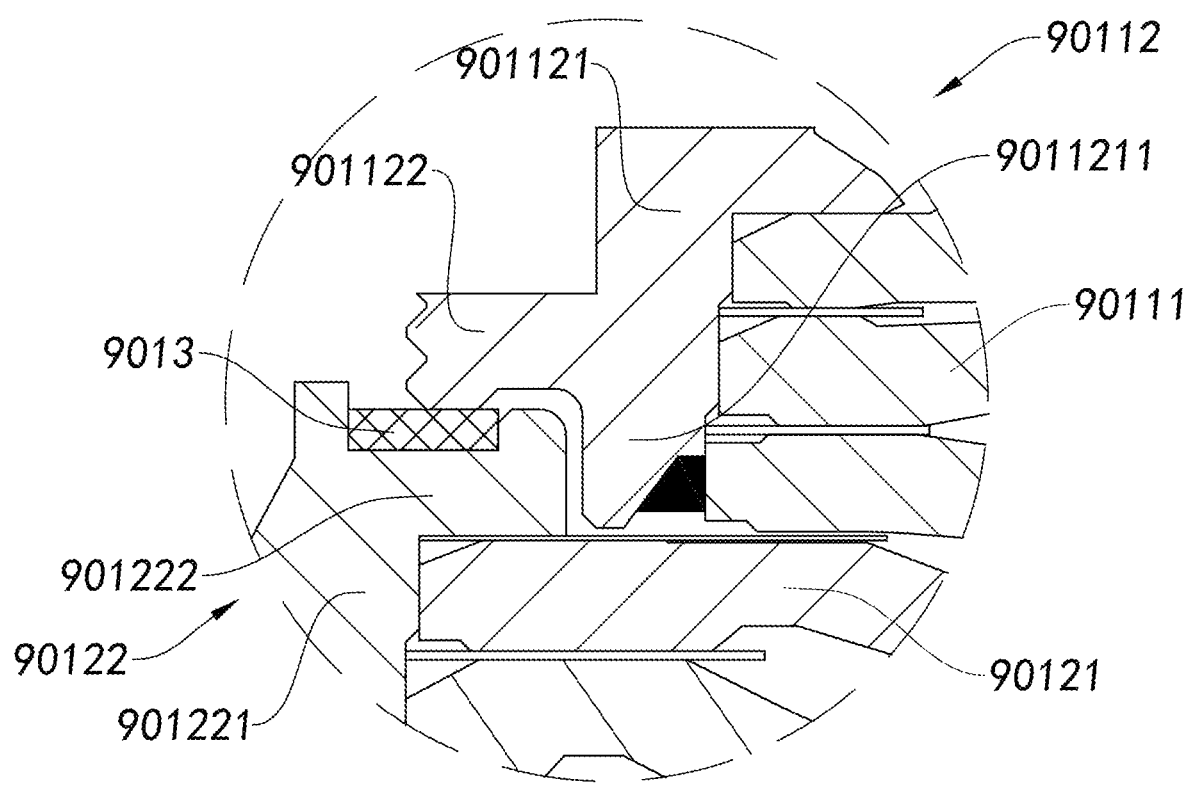
FIG. 16 is a partial enlarged diagram of FIG. 13.

FIG. 4 is a modified embodiment of the fixed-focus camera module, where the fixed-focus camera module of this embodiment of the present disclosure differs from the structure of the fixed-focus camera module of the above preferred embodiment in the position at which the optical filtering element 60 is packaged. Specifically, in the fixed-focus camera module of this embodiment of the present disclosure, the optical filtering element 60 is disposed on the circuit board 50, and the optical filtering element 60 overlays on the photosensing component 10. Preferably, the optical filtering element 60 and the photosensing component 10 are directly mounted together. When the circuit board 50 is packaged in the lens base 30, the optical filtering element 60 is held between the optical lens assembly 20 and the photosensing component 10. In another modified embodiment, as shown in FIG. 12, the lens base 30 may integrally clad around the optical filtering element 60, the photosensing component 10 and the circuit board 50, thereby forming an integred unitary structure.

Figure 5A:
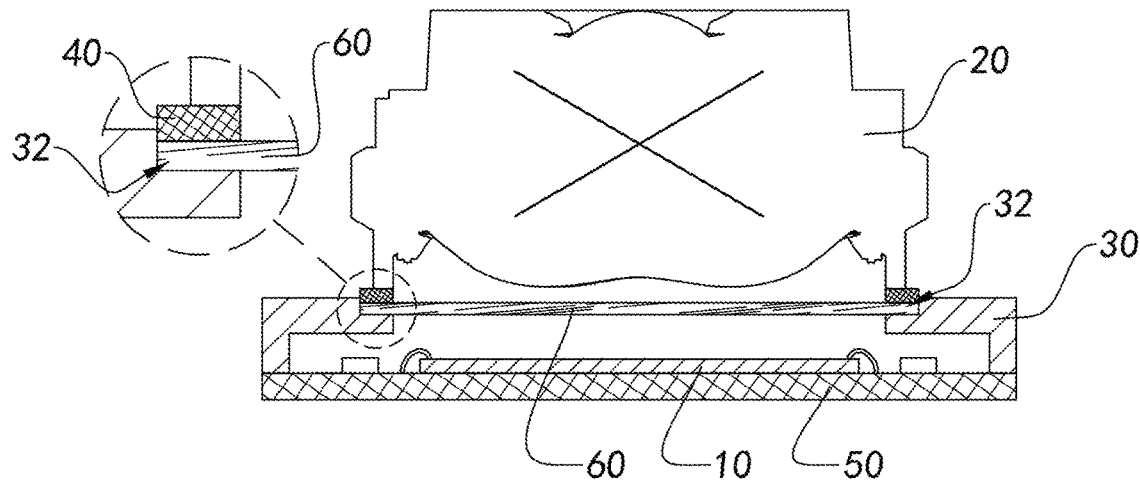
FIG. 5A is a cross-sectional schematic diagram of another modified embodiment of the fixed-focus camera module according to the above preferred embodiment of the present disclosure.

FIG. 5A is another modified embodiment of the fixed-focus camera module, where the fixed-focus camera module of this embodiment of the present disclosure differs from the structure of the fixed-focus camera module of the above preferred embodiment in the position at which the optical filtering element 60 is packaged. Specifically, in the fixed-focus camera module of this embodiment of the present disclosure, the optical filtering element 60 is packaged in the outer groove 32 of the lens base 30 to make the optical filtering element 60 more adjacent to the optical lens assembly 20, and the optical filtering element 60 packaged at the top end 302 of the lens base 30 can be held between the optical lens assembly 20 and the photosensing component 10. That is, the outer groove may be used to mount the optical filtering element 60 and provide installation space for the glue layer 40.

It is worth mentioning that in some embodiments, a portion of the optical lens assembly 20 may be mounted to the optical filtering element 60 and a portion may be mounted to the lens base 30. That is, after the optical filtering element 60 is mounted, glue may be applied at the bottom end of the optical lens assembly 20 or the top ends of the optical filtering element 60 and the lens base 30, and the glue layer 40 is then formed between the optical lens assembly 20, the lens base 30, and the optical filtering element 60.

Figure 5B:
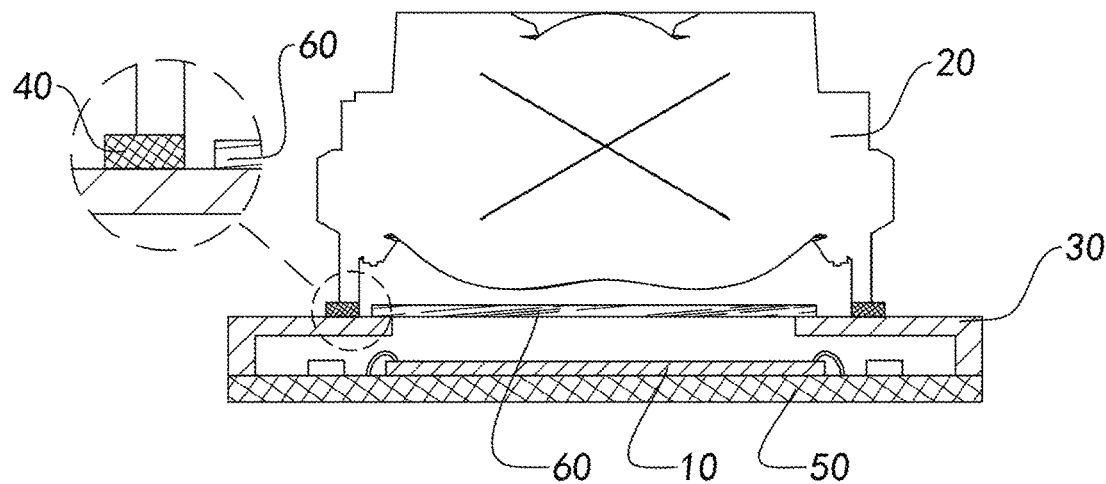
FIG. 5B is a cross-sectional schematic diagram of yet another modified embodiment of the fixed-focus camera module according to the above preferred embodiment of the present disclosure.

FIG. 5B is yet another modified embodiment of the fixed-focus camera module. In this embodiment, the top surface of the lens base 30 is a planar structure, that is, the lens base 30 does not have a first groove 3003 and a second groove 3004.

The glue layer 40 is disposed between the top end of the integrated base 3000 and the optical lens assembly 20. The optical filtering element 60 is disposed at the top end of the integrated base 3000. More specifically, the optical filtering element 60 is located at the interior of the optical lens assembly 20.

Figure 6:
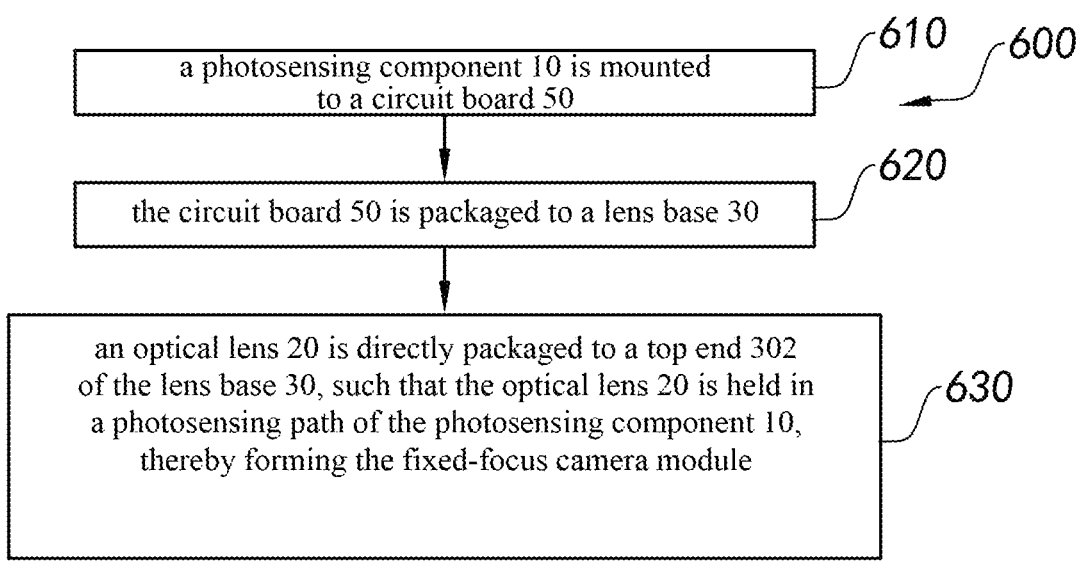
FIG. 6 is a block schematic diagram showing the flow of a method for manufacturing the fixed-focus camera module according to the above preferred embodiment of the present disclosure.

Referring to FIG. 6, according to an aspect of the present disclosure, as an example, the present disclosure further provides a method 600 for manufacturing a camera module, where the method 600 includes the following steps:

Step 610, (a) mounting a photosensing component 10 to a circuit board 50;

Step 620, (b) packaging the circuit board 50 to a lens base 30; and

Step 630, (c) packaging an optical lens assembly 20 at a top end 302 of the lens base 30 such that the optical lens assembly 20 protrudes outwardly from the lens base 30, and maintaining the optical lens assembly 20 in a photosensing path of the photosensing component 10, thereby forming the fixed-focus camera module. It may be understood that there may be no sequence between the above steps. The lens base 30 may be first disposed on the circuit board 50, and then the photosensing component 10 may be mounted to the circuit board 50.

Further, in the step (a), the method further includes the steps of:

(a.1) fixing the photosensing component 10 to the circuit board 50; and (a.2) electrically connecting the photosensing component 10 and the circuit board 50 by wire bonding to mount the photosensing component 10 to the circuit board 50.

In one embodiment, before the step (b), the method further includes the steps of: packaging an optical filtering element 60 at the lens base 30, and in the step (b), making the optical filtering element 60 correspond to a position of the photosensing component 10 mounted to the circuit board 50. Preferably, the lens base 30 has an inner groove 31, and the optical filtering element 60 is packaged in the inner groove 31 of the lens base 30 to lower the height of the fixed-focus camera module.

In another embodiment, before the step (b), the method further includes the step of: packaging the optical filtering element 60 to the circuit board 50, where the optical filtering element 60 covers a photosensing surface of the photosensing component 10.

Further, in the above method, a glue layer 40 is disposed between the optical lens assembly 20 and the lens base 30, and the glue layer is cured after a focusing operation on the fixed-focus camera module is performed.

Further, in the above method, glue is dispensed on at least one of the optical lens assembly 20 and the lens base 30, after the focusing operation on the fixed-focus camera module is performed, the glue is cured to form the glue layer 40 between the optical lens assembly 20 and the lens base 30. Preferably, the lens base 30 has an outer groove 32. The glue layer 40 directly packages the optical lens assembly 20 in the outer groove 32 of the lens base 30 to reduce the height of the fixed-focus camera module.

According to another aspect of the present disclosure, the present disclosure further provides a method for manufacturing a fixed-focus camera module, where the manufacturing method includes the following steps:

dispensing glue between a lens base 30 and an optical lens assembly 20, such that the glue seals the joint between the lens base 30 and the optical lens assembly 20 holding the optical lens assembly 20 from the exterior of the lens base 30, to adjust a position of the optical lens assembly 20 relative to the lens base 30, where the focusing mechanism causes solid particle contaminants generated on an outer surface of the optical lens assembly 20 to be blocked by the glue, to prevent the solid particle contaminants from entering an interior from an exterior of the fixed-focus camera module through the joint of the lens base 30 and the optical lens assembly 20, to form the fixed-focus camera module.

Further, in the above method, after the focusing operation is performed on the fixed-focus camera module, the glue is cured to form a glue layer 40 between the optical lens assembly 20 and the lens base 30.

According to another aspect of the present disclosure, the present disclosure further provides a method for manufacturing a fixed-focus camera module, where the manufacturing method includes the following steps:

fixing an optical lens assembly 20 at an exterior of a lens base 30, and adjusting a position of the optical lens assembly 20 relative to the lens base 30; and forming a glue layer 40 between the lens base 30 and the optical lens assembly 20, such that the glue layer 40 seals a joint between the lens base 30 and the optical lens assembly 20, where solid particle contaminants generated on an outer surface of the optical lens assembly 20 are blocked by the glue layer 40, to prevent the solid particle contaminants from entering an interior from an exterior of the fixed-focus camera module through the joint between the lens base 30 and the optical lens assembly 20, to form the fixed-focus camera module.

That is, after a relative position between the optical lens assembly 20 and the lens base 30, i.e., a relative position between the optical lens assembly 20 and the photosensing component 10, is first determined by a suitable focusing mechanism and a fixed light shielding structure, glue is dispensed and cured to fix the optical lens assembly 20 to the top end of the lens base 30.

Figure 7A:
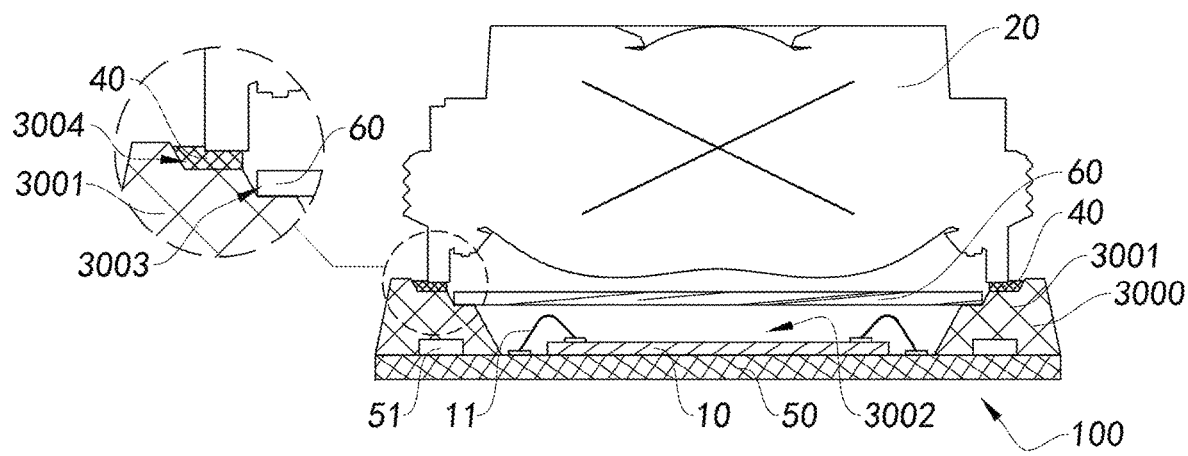
FIG. 7A is a cross-sectional schematic diagram of a fixed-focus camera module according to a second preferred embodiment of the present disclosure.

As shown in FIG. 7A, a cross-sectional schematic diagram of a fixed-focus camera module according to a second preferred embodiment of the present disclosure is illustrated.

In this embodiment of the present disclosure, the fixed-focus camera module includes a photosensing assembly 100 and the optical lens assembly 20, where an optical lens assembly 20 is packaged on the top of the photosensing assembly 100, and the optical lens assembly 20 is positioned in a photosensing path of the photosensing assembly 100.

The photosensing assembly 100 includes a photosensing component 10, a circuit board 50, and an integrated base 3000. The photosensing component 10 is electrically connected to the circuit board 50. The integrated base 3000 is integrally formed on the circuit board 50.

The integrated base 3000 includes a molded body 3001 and has a light window 3002. The molded body 3001 is integrally formed on the circuit board 50 by molding, and forms the light window 3002 in the middle portion for providing a light passage for the photosensing component 10.

In this embodiment of the present disclosure, the optical lens assembly 20 is directly packaged on the top of the integrated base 3000, such that the optical lens assembly 20 is positioned in the photosensing path of the photosensing component 10 and constitutes the fixed-focus camera module is formed. That is, the fixed-focus camera module of the present disclosure does not need to provide the lens barrel structure in the prior art, and in this way, the volume of the fixed-focus camera module around the optical lens assembly 20 can be reduced, so that when the fixed-focus camera module is mounted to an electronic device, the fixed-focus camera module can occupy the space of the electronic device as little as possible, thereby enabling the electronic device to leave more space for the installation of other components and parts.

In addition, the fixed-focus camera module of the present disclosure does not need to provide the lens barrel structure in the prior art, but directly packages the optical lens assembly 20 in the integrated base 3000. In this way, the use of materials used can be reduced in order to reduce the cost of the fixed-focus camera module, thereby improving the product competitiveness of the fixed-focus camera module.

Further, in this embodiment of the present disclosure, the integrated base 3000 is integrally disposed on the circuit board 50 by molding, so that the integrated base 3000 has good surface flatness for providing a flatter mounting surface for the optical lens assembly 20.

The photosensing assembly 100 includes a circuit element 51, the circuit element 51 is electrically connected to the circuit board 50 for the photosensing operation of the photosensing component 10. The circuit element 51 may be, for example but not limited to, a resistor, a capacitor, a diode, a triode, a potentiometer, a relay, a driver, and the like.

It is worth mentioning that the molded body 3001 may clad the circuit element 51 inside, so that the circuit element 51 may not be directly exposed to the space, and more specifically, may not be exposed to the enclosed environment connected to the photosensing component 10. Different from the existing modes of circuit devices in the conventional camera module, such as the resistor or the capacitor protruding out of the circuit board 50, the present disclosure prevents dust and debris from staying in the circuit element 51 and contaminating the photosensing component 10. In this embodiment of the present disclosure, the circuit element 51 protruding out of the circuit board 50 is used as an example, while in other embodiments of the present disclosure, the circuit element 51 is embedded inside the circuit board 50 without protruding out of the circuit board 50. It should be understood by those skilled in the art that the structure, type and set location of the circuit element 51 are not limited in the present disclosure. It may be understood that in the conventional camera module, the circuit device protrudes out from the circuit board 50, while the base can only be mounted on the outside of the circuit element 51. Therefore, the circuit devices and the base both need a certain spatial and position, so the circuit board 50 requires a higher lateral size. For the camera module based on the integrated packaging process of the present disclosure, the molded body 3001 is integrally packaged in the circuit board 50, and clads the circuit element 51. Therefore, the molded body 3001 and the circuit element 51 overlap each other in space, thereby increasing the space that may be set inward by the molded body 3001 and reducing the need for the external extension of the circuit board 50. The lateral size of the camera module is reduced to meet the miniaturization requirement of the device.

It is worth mentioning that the molded body 3001 clading the circuit element 51 has the advantage of protecting the circuit element 51 from being contaminated and mistakenly touched, while bringing advantages to the corresponding camera module, but it should be understood by those skilled in the art that the molded body 3001 is not limited to covering the circuit element 51. That is, in other embodiments of the present disclosure, the molded body 3001 may be directly molded on the circuit board 50 not having a protruding circuit element 51, or at a different location such as the exterior or surrounding of the circuit element 51.

In this embodiment of the present disclosure, the molded body 3001 protrudingly surrounds the outside of the photosensing component 10, and in particular, the molded body 3001 is in integrally closed connection so that it has good sealing property, so that when the optical lens assembly 20 is mounted in the photosensing path of the photosensing component 10, the photosensing component 10 is sealed inside, thereby forming a corresponding enclosed inner space.

The photosensing component 10 is electrically connected to the circuit board 50 through at least one connecting wire 11. The connection line 11 may be implemented as, for example, but not limited to, gold wire, copper wire, aluminum wire, silver wire, pad, wire and pins.

Specifically, when manufacturing the photosensing assembly 100, a conventional circuit board 50 may be selected as the circuit board 50 and molding is performed on the surface of the circuit board 50. For example, in an embodiment, the circuit board 50 after a SMT (Surface Mount Technology) process may be integrally packaged by insert molding process using a molding mold, for example, a molding package, to form the molded body 3001, or the molded body 3001 is formed by a commonly used compression molding process in semiconductor packaging. Further, the photosensing components 10 are mounted to the circuit board 50, and then the photosensing components 10 are electrically connected with the circuit board 50, such as by a golden wire bonding electric connection. The circuit board 50 may be selected to be, for example, but not limited to, Rigid-flex bonding board, ceramic substrate (without flexboard), PCB rigid board (without flex boards), etc. The forming method of the molded body 3001 may be selected as, for example, but not limited to, injection molding process, compression molding process, etc. The materials that may be selected by the molded body 3001 are, for example, but not limited to, nylon, LCP (Liquid Crystal Polymer), PP (Polypropylene) for injection molding process and epoxy resin for compression molding process. It should be understood by those skilled in the art that the aforementioned alternative manufacturing methods and alternative materials are not limited by the present disclosure, but merely examples to illustrate implementable methods of the present disclosure.

In other embodiments of the present disclosure, the process of manufacturing the photosensing assembly 100 may also be as follows: first performing SMT process on the circuit board 50, then mounting the photosensing component 10 to the circuit board 50, and electrically connecting the photosensing component 10 with the circuit board 50, such as a golden wire bonding electric connection, and then integrally packaging the circuit board 50, such as a molding packaging. The molded body 3001 is formed through the inset molding process or by the compression molding process commonly used in semiconductor packaging. It should be understood by those skilled in the art that the manufacturing sequence of the photosensing assembly 100 is not limited by the present disclosure.

In the process of packaging the fixed-focus camera module of the present disclosure, the position of the optical lens assembly 20 relative to the photosensing component 10 is adjusted by holding the optical lens assembly 20 from the outside of the optical lens assembly 20 by the focusing mechanism, so as to improve the imaging quality of the fixed-focus camera module, such as actively calibrating the optical lens assembly and/or the photosensing assembly so that the optical axis of the optical lens assembly 20 is aligned with the optical axis of the photosensing assembly 100. Therefore, in this process, even if the focusing mechanism causes the optical lens assembly 20 to generate contaminants such as solid particles, the contaminants such as solid particles do not enter the interior of the fixed-focus camera module to prevent stains caused by the contaminants such as solid particles, thereby ensuring the imaging quality of the fixed-focus camera module. After the contaminants such as solid particles are generated, the contaminants such as solid particles may adhere to the outer surface of the fixed-focus camera module at most, and after the fixed-focus camera module is packaged, the contaminants such as solid particles that adhere to the outer surface of the fixed-focus camera module can be removed by cleaning, to ensure the imaging quality of the fixed-focus camera module during use when configured in the electronic device.

Further, as shown in FIG. 7A, the fixed-focus camera module includes a glue layer 40, the glue layer 40 is located between the optical lens assembly 20 and the integrated base 3000 for packaging the optical lens assembly 20 directly in the integrated base 3000. Correspondingly the glue layer 40 is in an annular shape and connects the annular outer edge of the optical lens assembly 20 with the integrated base 3000. Preferably, the glue layer 40 is formed of opaque materials. It is worth mentioning that the glue layer 40 can not only connect the optical lens assembly 20 and the integrated base 3000, but also be used to seal the joint between the optical lens assembly 20 and the integrated base 3000, thereby preventing contaminants such as solid particles or external contaminants or external light from entering the interior of the fixed-focus camera module from the outside of the fixed-focus camera module through the joint of the optical lens assembly 20 and the integrated base 3000, thus ensuring the imaging quality of the fixed-focus camera module.

The glue layer 40 is formed at the joint of the optical lens assembly 20 and the integrated base 3000. Specifically, the dispensing is selectively performed at a corresponding position of at least one of the optical lens assembly 20 and the integrated base 3000. After the dispensing operation is completed, the lower end surface of the optical lens assembly 20 is mounted to the integrated base 3000 for placing the glue between the optical lens assembly 20 and the integrated base 3000, and the fixed-focus camera module is focused. When focusing, the optical lens assembly 20 may be held from the outside of the optical lens assembly 20. After the focusing is completed, the glue is cured to form the glue layer 40 between the optical lens assembly 20 and the integrated base 3000. Preferably, dispensing may be performed only at the corresponding position of the integrated base 3000 to prevent glue from contaminating the optical lens assembly 20. More preferably, the glue may be cured by irradiation of ultraviolet light (Ultraviolet Rays), i.e., the glue layer 40 may use ultraviolet curing adhesive. Of course, it may be understood by those skilled in the art that other suitable glues may also be used and the glue may be cured by other methods, such as thermal curing.

It is worth mentioning that after the dispensing operation is completed at the corresponding position of the integrated base 3000, the glue may be semi-cured to prevent the glue from contaminating the optical lens assembly 20 in the process of packaging the optical lens assembly 20 in the integrated base 3000. In other words, after the glue is applied to the integrated base 3000 by dispensing, the glue may be semi-cured to make the semi-cured glue have viscosity and plasticity. After the lower end surface of the optical lens assembly 20 is mounted to the integrated base 3000 and the focusing of the fixed-focus camera module is completed, the glue is cured to form the glue layer 40 between the optical lens assembly 20 and the integrated base 3000. On the one hand, the glue layer 40 holds the optical lens assembly 20 in a position after being focused, and on the other hand, the glue layer 40 seals the joint of the optical lens assembly 20 and the integrated base 3000. Of course, it is also possible to completely cure the glue to form the glue layer 40 after the focusing operation without the semi-cured state.

In the process of packaging the fixed-focus camera module of the present disclosure, the glue layer 40 can improve the flatness of the optical lens assembly 20 and the integrated base 3000, so that the central axis of the optical lens assembly 20 can coincide with the central axis of the photosensing component 10 to improve the imaging quality of the fixed-focus camera module. That is, the glue layer 40 can compensate for the product error of the optical lens assembly 20, the product error of the integrated base 3000 and the mounting errors of the optical lens assembly 20 and the integrated base 3000, thereby improving the imaging quality of the fixed-focus camera module.

In this embodiment of the present disclosure, the optical filtering element 60 is disposed between the photosensing component 10 and the optical lens assembly 20 for improving the imaging quality of the fixed-focus camera module. Light reflected by an object enters the interior of the fixed-focus camera module from the optical lens assembly 20, and is further received and photoelectrically converted by the photosensing component 10 after being filtered by the optical filtering element 60 to generate an image associated with the object. That is, the optical filtering element 60 can filter stray lights in the light reflected by the object and entering from the optical lens assembly 20 into the interior of the fixed-focus camera module, to improve the imaging quality of the fixed-focus camera module. Specifically, the optical filtering element 60 is disposed on the integrated base 3000.

Referring to FIG. 7A, the integrated base 3000 has a first groove 3003 and a second groove 3004, and the first groove 3003 and the second groove 3004 are connected to the light window 3002, to facilitate the installation of the optical filtering element 60 and the optical lens assembly 20. In this way, the height of the fixed-focus camera module can be effectively reduced so that the fixed-focus camera module is particularly suitable for being applied to the electronic devices that seek to be light and thin.

More specifically, the optical filtering element 60 is mounted in the first groove 3003, and the optical lens assembly 20 is mounted in the second groove 3004. It is worth mentioning that in this embodiment of the present disclosure, the integrated base 3000 is formed by integral molding, and has good surface smoothness. Therefore, the inner surfaces of the first groove 3003 and the second groove 3004 are relatively flat, providing flat mounting surfaces for the optical filtering element 60 and the optical lens assembly 20.

That is to say, in the manufacture of the fixed-focus camera module, medium such as glue may be applied at the bottom of the integrated base 3000 and the second groove 3004 or the optical lens assembly 20, thereby the glue layer 40 is formed between the inner surfaces of the optical lens assembly 20 and the second groove 3004, thereby the optical lens assembly 20 is stably mounted to the integrated base 3000 to form the fixed-focus camera module. Of course, before fixing the optical lens assembly 20, the camera module needs to be adjusted by the focusing mechanism, to adjust the relative position between the optical lens assembly 20 and the photosensing assembly 100, in order to improve the imaging quality of the fixed-focus camera module.

In the process of packaging the fixed-focus camera module in this embodiment of the present disclosure, step 1, the circuit board 50 and the photosensing component 10 may be first fixed together, and the circuit board 50 and the photosensing component 10 are electrically connected by the wire bonding process, to connect the photosensing component 10 conduct with the circuit board 50.

Step 2, the optical filtering element 60 is packaged in the integrated base 3000. For example, in the example shown in FIG. 7 of the present disclosure, the optical filtering element 60 may be packaged in the first groove 3003 of the integrated base 3000.

Step 3, the circuit board 50 and the integrated base 3000 are assembled so that the optical filtering element 60 corresponds to the photosensing component 10 mounted to the circuit board 50.

Step 4, dispensing is performed on the corresponding position of the integrated base 3000. It is worth mentioning that the amount of glue may be provided as needed, such as the amount of glue being able to ensure access to the lower end surface of the optical lens assembly 20. It is worth mentioning that the amount of glue depends on its properties and coating area.

Step 5, the optical lens assembly 20 is mounted to the integrated base 3000 so that glue is located between the optical lens assembly 20 and the integrated base 3000, and the optical lens assembly 20 is guaranteed to be in the photosensing path of the photosensing component 10.

Step 6, the position of the optical lens assembly 20 relative to the photosensing component 10 is adjusted to focus the fixed-focus camera module. Specifically, the photosensing component 10 is powered by the circuit board 50 so that the photosensing component 10 can output an image, and the fixed-focus camera module is focused based on the clarity of the image. The method of focusing the fixed-focus camera module may be that the focusing mechanism adjusts the position of the optical lens assembly 20 relative to the photosensing component 10 by holding the external surface of the optical lens assembly 20. Since the fixed-focus camera module of the present disclosure focuses the fixed-focus camera module from the exterior of the fixed-focus camera module, even if the focusing mechanism causes the solid particle contaminants on the outer surface of the optical lens assembly 20, the solid particle contaminants do not enter the interior of the fixed-focus camera module to improve the imaging quality of the fixed-focus camera module. It is worth mentioning that during the focusing operation on the fixed-focus camera module of the present disclosure, although the focal length of the fixed-focus camera module can be adjusted by adjusting the position of the optical lens assembly 20 relative to the photosensing component 10, in other examples, the position of the photosensing component 10 relative to the optical lens assembly 20 may also be adjusted by moving the integrated base 3000, i.e., moving the photosensing assembly 100 as a whole.

Step 7, glue is cured to form the glue layer 40 between the optical lens assembly 20 and the integrated base 3000. It may be understood that, on the one hand, the glue layer 40 can be used to connect the optical lens assembly 20 and the integrated base 3000 so that the optical lens assembly 20 can be held in the photosensing path of the photosensing component 10, and on the other hand, the glue layer 40 can prevent external contaminants from entering the interior from the outside of the fixed-focus camera module through the joint of the optical lens assembly 20 and the integrated base 3000. On the other hand, the glue layer 40 can prevent the external light from entering the interior from the outside of the fixed-focus camera module through the joint of the optical lens assembly 20 and the integrated base 3000. In addition, the glue layer 40 can also compensate for the product error of the optical lens assembly 20, the product error of the integrated base 3000 and the mounting errors of the optical lens assembly 20 and the integrated base 3000, to prevent the relative inclination of the optical lens assembly 20 and the photosensing component 10, thereby improving the imaging quality of the fixed-focus camera module.

Figure 7B:
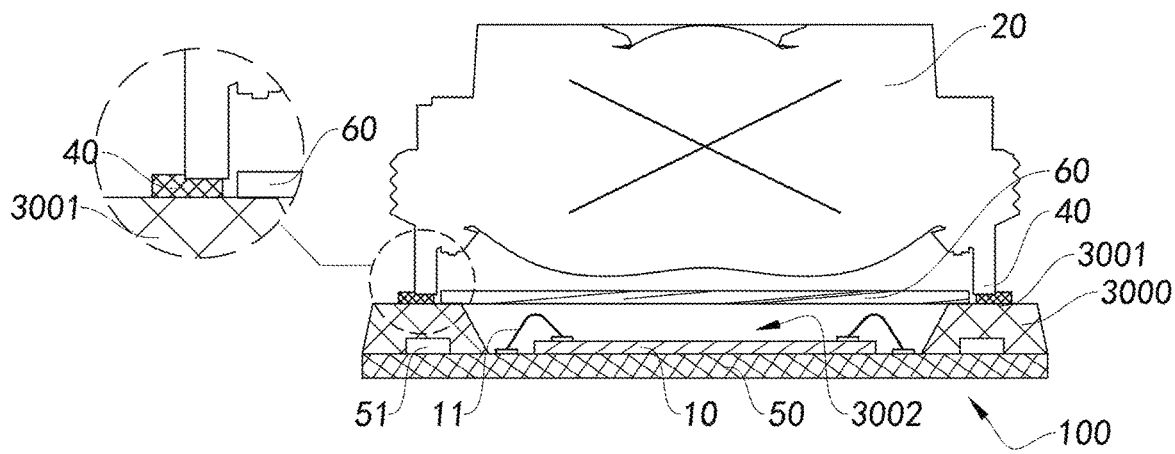
FIG. 7B is a cross-sectional schematic diagram of a modified embodiment of the fixed-focus camera module according to the second preferred embodiment of the present disclosure.

As shown in FIG. 7B, is a modified embodiment of the fixed-focus camera module according to the second preferred embodiment of the present disclosure. In this embodiment, the top surface of the integrated base 3000 is a plane structure, that is, the integrated base 3000 does not have the first groove 3003 and the second groove 3004.

The glue layer 40 is provided between the top end of the integrated base 3000 and the optical lens assembly 20. The optical filtering element 60 is provided at the top end of the integrated base 3000. More specifically, the optical filtering element 60 is positioned on the inner side of the optical lens assembly 20.

Figure 8:
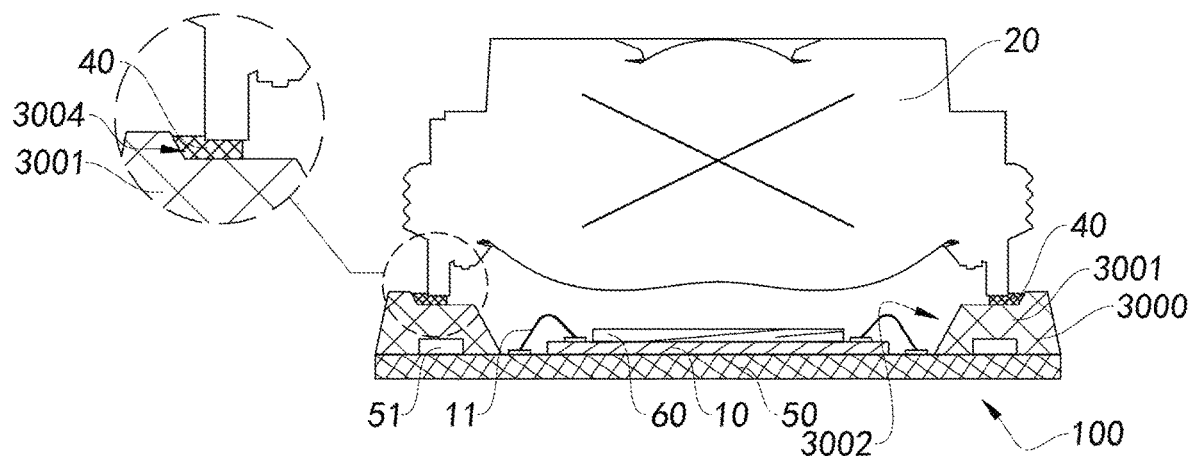
FIG. 8 is a cross-sectional schematic diagram of a first modified embodiment of the fixed-focus camera module according to the second preferred embodiment of the present disclosure.

FIG. 8 is a first modified embodiment according to the second preferred embodiment of the present disclosure. In this embodiment of the present disclosure, the optical filtering element 60 covers the photosensing component 10. The coverage mode of the optical filtering element 60 is, for example, but not limited to, covering the photosensing component 10 by bonding and fixing, such as by setting to the photosensing component 10 by compounding, or by mountcovering the photosensing component 10 by mounting. When the optical lens assembly 20 is packaged in the integrated base 3000 of the photosensing assembly 100, the optical filtering element 60 is held between the optical lens assembly 20 and the photosensing component 10.

Further, the integrated base 3000 has the second groove 3004 for mounting the optical lens assembly 20, that is, in this embodiment of the present disclosure, the integrated base 3000 does not have the first groove 3003 for mounting the optical filtering element 60.

Figure 9:
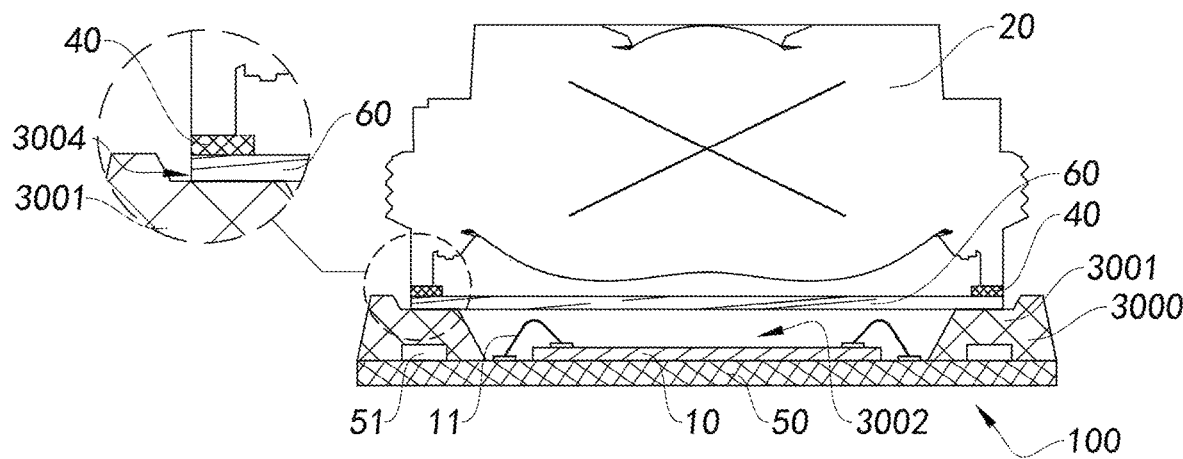
FIG. 9 is a cross-sectional schematic diagram of a second modified embodiment of the fixed-focus camera module according to the second preferred embodiment of the present disclosure.

FIG. 9 is a second modified embodiment according to the second preferred embodiment of the present disclosure. In this embodiment of the present disclosure, the integrated base 3000 has the second groove 3004, and the optical filtering element 60 and the optical lens assembly 20 are mounted to the second groove 3004. The optical filtering element 60 is packaged in the second groove 3004 of the integrated base 3000 such that the optical filtering element 60 is further adjacent to the optical lens assembly 20, and the optical filtering element 60 packaged in the integrated base 3000 can be held between the optical lens assembly 20 and the photosensing component 10. That is, the second groove 3004 may be used to mount the optical filtering element 60 and provide an installation space for the glue layer 40.

More specifically, in this embodiment of the present disclosure, the glue layer 40 is disposed between the optical lens assembly 20 and the optical filtering element 60.

The fixed-focus camera module of this embodiment of the present disclosure may be formed by: integrally forming the integrated base 3000 on the circuit board 50, and electrically connecting the photosensing component 10 on the circuit board 50, thereby the photosensing assembly 100 is formed; then mounting the optical filtering element 60 in the second groove 3004 of the integrated base 3000, and applying glue at the edge position of the optical filtering element 60 or applying glue at the bottom end of the optical lens assembly 20; then mounting the optical lens assembly 20 to the optical filtering element 60 such that glue is located between the optical filtering element 60 and the optical lens assembly 20, and the optical lens assembly 20 is in the photosensing path of the photosensing component 10; further, adjusting the position of the optical lens assembly 20 relative to the photosensing component 10 to focus the fixed-focus camera module; further, curing the glue to form the glue layer 40 between the optical lens assembly 20 and the optical filtering element 60.

Figure 10A:
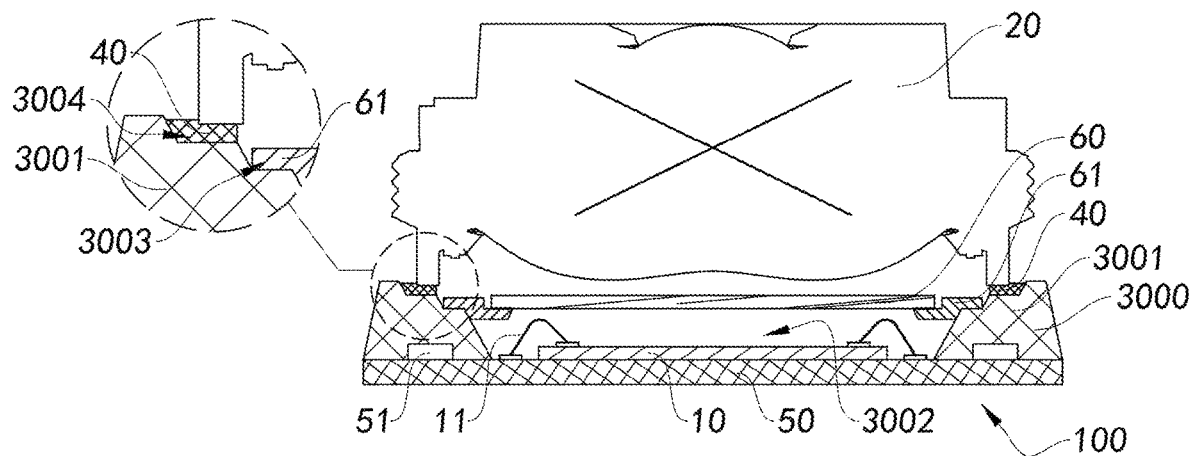
FIG. 10A is a cross-sectional schematic diagram of a fixed-focus camera module according to a third preferred embodiment of the present disclosure.

As shown in FIG. 10A, is a schematic diagram of a fixed-focus camera module according to a third preferred embodiment of the present disclosure. In this embodiment of the present disclosure, the integrated base 3000 has the first groove 3003 and the second groove 3004, and the fixed-focus camera module includes a support 61, the support 61 is used for mounting the optical filtering element 60, and the support 61 is mounted to the first groove 3003.

The glue layer 40 is disposed between the integrated base 3000 and the optical lens assembly 20. More specifically, the glue layer 40 is disposed on the second groove 3004. That is, the optical lens assembly 20 is mounted to the second groove 3004 through the glue layer 40.

That is, when assembling the fixed-focus camera module, the optical filtering element 60 may be mounted to the support 61, then the support 61 is mounted to the first groove 3003, and then glue is applied at a predetermined position of the surface of the support 61 or the end of the optical lens assembly 20. The optical lens assembly 20 is further pre-mounted to the integrated base 3000 such that glue is located between the integrated base 3000 and the optical lens assembly 20, and the optical lens assembly 20 is positioned in the photosensing path of the photosensing component 10. Further, the position of the optical lens assembly 20 relative to the photosensing component 10 is adjusted to perform focusing on the fixed-focus camera module. Further, the glue is cured to form the glue layer 40 between the optical lens assembly 20 and the integrated base 3000.

Figure 10B:
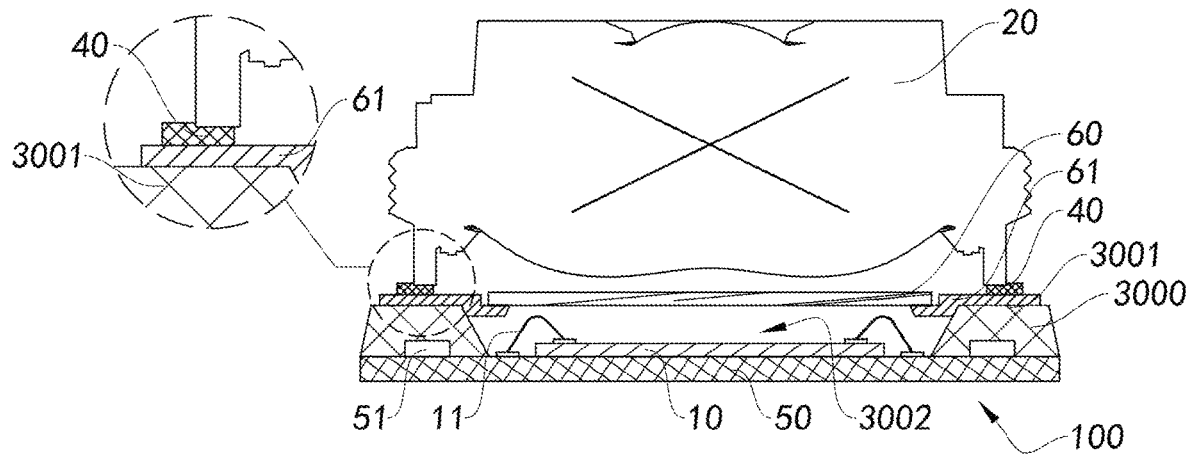
FIG. 10B is a cross-sectional schematic diagram of a modified embodiment of the fixed-focus camera module according to the third preferred embodiment of the present disclosure.

As shown in FIG. 10B, a schematic diagram of a modified embodiment of the fixed-focus camera module according to the third preferred embodiment of the present disclosure is illustrate. In this embodiment of the present disclosure, the integrated base 3000 has the second groove 3004, and the fixed-focus camera module includes a support 61, the support 61 is used for mounting the optical filtering element 60, and the support 61 is mounted to the second groove 3004.

More specifically, in this embodiment of the present disclosure, the glue layer 40 is disposed between the support 61 and the optical lens assembly 20.

That is, when assembling the fixed-focus camera module, the optical filtering element 60 may be mounted to the support 61, then the support 61 is mounted to the second groove 3004, and then glue is applied on a predetermined position of the surface of the support 61 or the end of the optical lens assembly 20. The optical lens assembly 20 is further pre-mounted to the support 61 such that glue is between the support 61 and the optical lens assembly 20, and the optical lens assembly 20 is positioned in the photosensing path of the photosensing component 10. Further, the position of the optical lens assembly 20 relative to the photosensing component 10 is adjusted to perform focusing on the fixed-focus camera module. Further, the glue is cured to form the glue layer 40 between the optical lens assembly 20 and the support 61.

Figure 11:
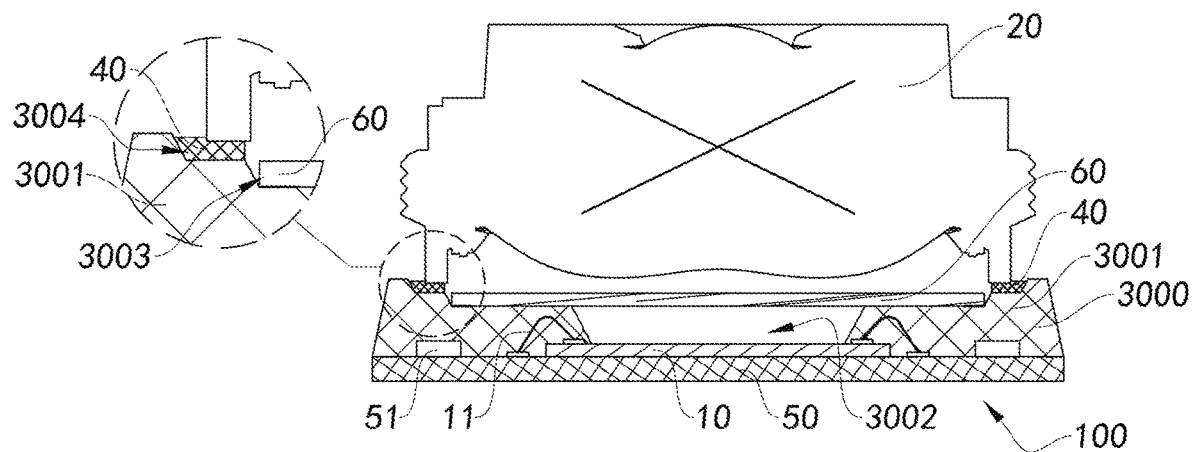
FIG. 11 is a cross-sectional schematic diagram of a fixed-focus camera module according to a fourth preferred embodiment of the present disclosure.

As shown in FIG. 11, a fixed-focus camera module according to a fourth preferred embodiment of the present disclosure is illustrated. In this embodiment of the present disclosure, the integrated base 3000 integrally packages the circuit board 50 and at least a portion of the photosensing component 10. The integrated base 3000 clads the connecting wire 11. That is, in this embodiment of the present disclosure, the integrated base 3000 extends inwardly to the edge of the photosensing component 10. The optical lens assembly 20 is directly disposed on the integrated base 3000.

It is worth mentioning that the photosensing component 10 may be fixed to the circuit board 50 through integrally packaging the circuit board 50 and at least a portion of the photosensing component 10 by the integrated base 3000, so that it may be fixed without separately fixing the photosensing component 10 and the circuit board 50 while expanding the packaging range of the integrated base 3000 inwardly, thereby reducing an outer area of the photosensing assembly 100.

FIG. 12 is a modified embodiment of the fixed-focus camera module according to the fourth preferred embodiment of the present disclosure. In this embodiment of the present disclosure, the optical filtering element 60 covers the photosensing component 10, and the integrated base 3000 integrally packages the circuit board 50, at least a portion of the photosensing component 10, and at least a portion of the optical filtering element 60.

That is, in this embodiment, the integrated base 3000 fixes the photosensing component 10 and the optical filtering element 60, so that a separate fixing method is not required.

Further, the integrated base 3000 has the second groove 3004 for mounting the optical lens assembly 20, that is, in this embodiment of the present disclosure, the integrated base 3000 does not have the first groove 3003 for mounting the optical filtering element 60.

As shown in FIGS. 13-18, a fixed-focus camera module and a multi-group lens assembly thereof according to a fifth preferred embodiment of the present disclosure are illustrated.

The fixed-focus camera module includes a multi-group lens assembly 90 that is directly mounted to the lens base 30. That is, in this embodiment of the present disclosure, the optical lens assembly 20 is the multi-group lens 90.

Further, the multi-group lens assembly 90 is directly mounted to the lens base 30 through the glue layer 40. The multi-group lens assembly 90 is exposed at the exterior of the lens base 30.

The multi-group lens assembly 90 includes a plurality of group units 9010, and two adjacent group units 9010 are assembled to each other.

It is worth mentioning that in the conventional fixed-focus camera module, the lens assembly is usually mounted in the lens barrel, and then the lens assembly is adjusted by adjusting the lens barrel. Similarly, for the multi-group lens assembly composed of a plurality of group units, in the conventional fixed-focus camera module, a lens barrel or the like is required to be mounted, thus it is not possible to adjust each of the group units 9010 directly, and the lens barrel component is not suitable for being held and adjusted. However, in the present disclosure, each of the group units 9010 is directly exposed at the exterior of the lens base 30. Therefore, when assembling the fixed-focus camera module, each of the group units 9010 may be conveniently adjusted, or the group unit 9010 that needs to be adjusted may be freely selected.

For convenience of description, in this embodiment of the present disclosure, the multi-group lens assembly 90 composed of two of the group units 9010 is taken as an example. In other embodiments of the present disclosure, the multi-group lens assembly 90 may include more of the group units 9010, such as three or more, and the present disclosure is not limited in this regard.

Specifically, the multi-group lens assembly 90 includes two group units 9010, which are an upper group unit 9011 and a lower group unit 9012, respectively. The upper group unit 9011 and the lower group unit 9012 are assembled to each other. The upper group unit 9011 and the lower group unit 9012 are stacked, and the optical axis directions of the upper group unit 9011 and the lower group unit 9012 are consistent.

The upper group unit 9011 includes at least an upper lens assembly 90111 and an upper bearing component 90112, and the upper lens assembly 90111 is disposed in the upper bearing component 90112 sequentially along the light path. Preferably, the number of the upper lens assembly 90111 is plural, such as 2, 3 or more.

The lower group unit 9012 includes at least a lower lens assembly 90121 and a lower bearing component 90122, and the lower lens assembly 90121 is disposed in the lower bearing component 90122 sequentially the light path. Preferably, the number of the lower lens assembly 90121 is plural, such as 2, 3 or more.

Further, in this embodiment of the present disclosure, the upper bearing component 90112 of the upper group unit 9011 includes an upper bearing body 901121 and an extension wall 901122. The upper bearing body 901121 is a hollow structure for accommodating, mounting the respective lenses and arranging the respective lenses along a light path. In other words, each of the upper lens assembly 90111 of the upper group unit 9011 is mounted inside the upper bearing body 901121 to facilitate providing a light passage. The extension wall 901122 extends outward from the outside of the upper bearing body 901121 to facilitate overlapping and joining with the lower bearing component 90122 of the lower group unit 9012.

More specifically, the extension wall 901122 integrally extends outward from the outside of the upper bearing body 901121. In some embodiments, the extension wall 901122 may be an annular extension wall extending outward from the upper bearing body 901121 to form an annular brim structure, so as to overlap and join with the lower bearing component 90122 of the lower group unit 9012 through the annular brim structure, to provide stable support for the upper group unit 9011.

When the upper group unit 9011 and the lower group unit 9012 are fixed, a bonding medium 9013, such as UV glue, thermosetting glue, UV thermosetting glue, or epoxy glue is disposed between the upper group unit 9011 and the lower group unit 9012, in order to stably fix the upper group unit 9011 and the lower group unit 9012. Of course, in other embodiments of the present disclosure, the upper group unit 9011 and the lower group unit 9012 may be fixed by other means, such as heat welding, ultrasonic welding, laser welding, riveting, fastening, and buckling, and the present disclosure is not limited in this regard. The bonding medium 9013 and the glue layer 40 may be formed of the same material and process, or may be formed of different materials and processes. The bonding medium 9013 may be selected from the group consisting of one or more of UV glue, thermosetting glue, UV thermosetting glue, epoxy glue, moisture curing glue, and pressure sensitive adhesive.

According to this embodiment of the present disclosure, the lower group unit 9012 is mounted to the lens base 30 directly through the glue layer 40.

The upper bearing body 901121 of the upper bearing component 90112 of the upper group unit 9011 has a lower muff-coupling end portion 9011211 located below the extension wall 901122, and the lower muff-coupling end portion n 9011211 is sleeved to the lower bearing component 90122 of the lower group unit 9012. In other words, the extension wall 901122 of the upper bearing component 90112 of the upper group unit 9011 divides the upper bearing body 901121 into two parts, the upper portion and the lower portion, and the lower portion is the lower muff-coupling end portion 9011211. When the extension wall 901122 of the upper bearing component 90112 of the upper group unit 9011 is overlapped with the lower bearing component 90122 of the lower group unit 9012, the lower muff-coupling end portion 9011211 is sleeved to the lower bearing component 90122 of the lower group unit 9012.

The lower bearing component 90122 of the lower group unit 9012 includes a lower bearing body 901221 and an upper overlapping end portion 901222. The lower bearing body 901221 is a hollow structure for accommodating and mounting each of the lower lens assembly 90121 and arranging them along a light path. In other words, each of the lower lens assembly 90121 of the lower group unit 9012 is mounted inside the lower bearing body 901221 to facilitate providing a light passage. The upper overlapping end portion 901222 is integrally connected to the lower bearing body 901221 so as to fit the upper bearing component 90112 of the upper group unit 9011, such that when the extension wall 901122 of the upper bearing component 90112 overlaps and joins the upper overlapping end portion 901222 of the lower bearing component 90122, the lower muff-coupling end portion 9011211 of the upper bearing component 90112 of the upper group unit 9011 extends into the upper overlapping end portion 901222 of the lower bearing component 90122, thereby the lower bearing component 90122 of the lower group unit 9012 constraining the mounting position of the upper group unit 9011.

In other words, in this embodiment of the present disclosure, the extension wall 901122 and the upper overlapping end portion 901222 form an assembled structure to facilitate assembling and muff-coupling the upper group unit 9011 and the lower group unit 9012.

The upper overlapping end portion 901222 is a hollow structure extending inwardly to facilitate providing an overlapping support position for the upper group unit 9011 and providing a light passage for each of the lower lenses 90121 located inside the lower bearing body 901221.

It is worth mentioning that the lens assembly optical axis consistency and assembly time are two important aspects in the actual production and application of the camera module, and the fixed-focus camera module formed by the multi-group lens assembly 90 in the present disclosure may be assembled in various ways, and each of the group units 9010 may be conveniently and directly held to adjust each of the group units 9010, thereby assembling the fixed-focus camera module accurately, conveniently and quickly.

For example, in one method, the lower group unit 9012 may first be pre-assembled to the lens base 30, then the lower group unit 9012 is directly adjusted by the focusing mechanism, and the lower group unit 9012 is fixed to the lens base 30 through the glue layer 40; then the upper group unit 9011 is pre-assembled to the lower group unit 9012, the upper group unit 9011 is directly adjusted by the focusing mechanism, and the upper group unit 9011 is fixed to the lower group unit 9012 by the bonding medium 9013; and the foregoing method is performed until all of the group units 9010 are fixed.

For example, in another method, the upper group unit 9011 and the lower group unit 9012 may be pre-assembled simultaneously in the photosensing path of the photosensing component 10; then the focusing mechanism directly adjusts the lower group unit 9012 and/or the upper group unit 9011, so that the pre-assembled fixed-focus camera module meets predetermined imaging requirements; and further the lower group unit 9012 is fixed to the lens base 30 through the glue layer 40, and the upper group unit 9011 is fixed to the lower group unit 9012 by the bonding medium 9013. Of course, the group units 9010 may also be first assembled into a full-featured lens assembly, that is, the multi-group lens assembly 90 is assembled and obtained first, and then assembled into the lens base 30 as a whole.

It is worth mentioning that, in the present disclosure, a plurality of group units 9010 are assembled to form an integral lens assembly, so that the number of lenses in each group unit 9010 is small, and the assembly error of each unit is small, but the multi-group lens assembly 90 composed of the respective group units 9010 has a large number of lenses, so that higher pixels may be provided and the cumulative error is small. In addition, the group units 9010 may be adjusted and assembled by the focusing mechanism in the process of assembling and forming the multi-group lens assembly, so that the relative error between the respective group units 9010 is reduced, and the manufacturing error of the lens assembly itself may be compensated by adjustment, thereby enabling the multi-group lens assembly 90 to have good optical consistency. Each of the group units 9010 is assembled to each other through an assembling structure, so that the group units 9010 are stably assembled to form the multi-group lens assembly 90, and the cooperation may block external stray light from entering the interior of the multi-group lens assembly 90 to avoid interference with the optical system of the multi-group lens assembly 90. And in some embodiments, the group units 9010 may be fixed by a rapidly forming bonding medium 9013, such as UV thermosetting glue. The cooperation structure may provide sufficient ultraviolet light irradiation area for the bonding medium, so that the group units may be assembled and fixed quickly and stably, thereby improving production efficiency.

Figure 17:
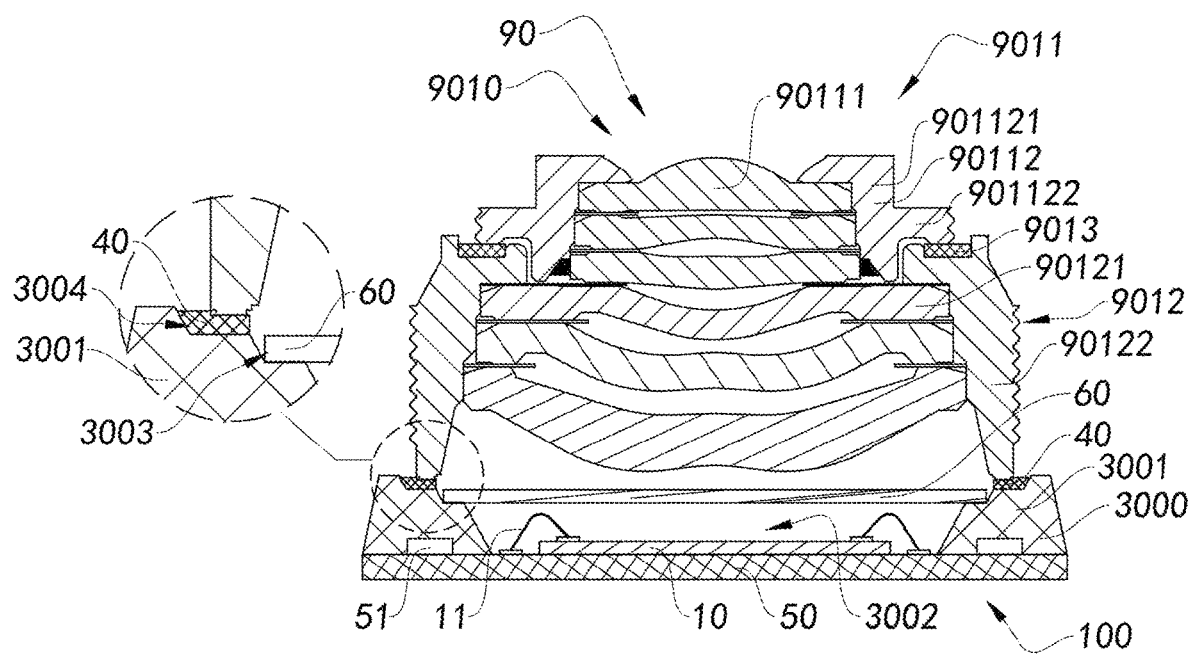
FIG. 17 is a cross-sectional schematic diagram of a fixed-focus camera module according to a sixth preferred embodiment of the present disclosure.

As shown in FIG. 17, a cross-sectional schematic diagram of a fixed-focus camera module according to a sixth preferred embodiment of the present disclosure is illustrated. Different from the above embodiments, the multi-group lens assembly 90 is directly mounted to the integrated base 3000. More specifically, the multi-group lens assembly 90 is directly fixed to the integrated base 3000 through the glue layer 40. That is, the glue layer 40 is disposed between the multi-group lens assembly 90 and the integrated base 3000.

When manufacturing the fixed-focus camera module, after the photosensing assembly with the integrated base 3000 is formed by integral molding, the multi-group lens assembly 90 or one of the group units 9010 is directly mounted to the integrated base 3000, such that the multi-group lens assembly 90 is directly mounted without providing a separate lens barrel component.

It is worth mentioning that, in this embodiment of the present disclosure, the integrated base 3000 is formed by integral molding, and has a flat surface, which may directly provide a flatter mounting plane for the multi-group lens assembly 90. It is beneficial to improve the imaging quality of the fixed-focus camera module.

The multi-group lens assembly 90 may be assembled in the integrated base 3000 in a plurality of methods to form the fixed-focus camera module of the molding type.

For example, in one method, the lower group unit 9012 may first be pre-assembled to the integrated base 3000, then the lower group unit 9012 is directly adjusted by the focusing mechanism, and the lower group unit is fixed to the integrated base 3000 through the glue layer; then the upper group unit 9011 is pre-assembled to the lower group unit 9012, the upper group unit is directly adjusted by the focusing mechanism, and then the upper group unit 9011 is fixed to the lower group unit 9012 by the bonding medium 9013; and the foregoing method is performed until all of the group units 9010 are fixed.

For example, in another method, the upper group unit 9011 and the lower group unit 9012 may be pre-assembled simultaneously in the photosensing path of the photosensing component 10; then the focusing mechanism directly adjusts the lower group unit 9012 and/or the upper group unit 9011, causing the pre-assembled fixed-focus camera module meeting predetermined imaging requirements; and the lower group unit 9012 is further fixed to the integrated base 3000 through the glue layer 40, and the upper group unit 9011 is fixed to the lower group unit 9012 by the bonding medium 9013.

For example, in another method, a plurality of the upper group units 9011 and the lower group units 9012 may be assembled into a complete multi-group lens assembly, and the multi-group lens assembly is fixed to the lower group units 9012 by the bonding medium 9013; and then the focusing mechanism directly adjusts the multi-group lens assembly 90, causing the pre-assembled fixed-focus camera module meeting predetermined imaging requirements. Further, the multi-group lens assembly is fixed to the integrated base 3000 through the glue layer 40.

Those skilled in the art should understand that the embodiments of the present disclosure described in the above description and the accompanying drawings are merely examples and do not limit the present disclosure.

The objective of the present disclosure has been achieved completely and effectively. The functions and structural principles of the present disclosure have been illustrated and described in the embodiments, and there may be any variations or modifications to the embodiments of the present disclosure without departing from the principles of the present disclosure.

What is claimed is:

1. A fixed-focus camera module, comprising:
   a photosensing component;
   an optical lens assembly, comprising at least two group units, wherein the respective group units are assembled in cooperation with each other, and optical axes of the group units are consistent; and
   a lens base, wherein the optical lens assembly is packaged at a top end of the lens base such that the optical lens assembly protrudes outward from the lens base, and the optical lens assembly is kept in a photosensing path of the photosensing component,
   wherein each of the group units comprises a bearing component and at least one lens, and the lens is mounted to the bearing component.

2. The fixed-focus camera module according to claim 1, further comprising a glue layer, wherein the glue layer is located between the optical lens assembly and the lens base, to directly package the optical lens assembly at the lens base through the glue layer, and the glue layer is used to seal a joint between the optical lens assembly and the lens base.

3. The fixed-focus camera module according to claim 2, wherein the top end of the lens base has an outer groove, and the optical lens assembly is directly packaged in the outer groove of the lens base through the glue layer.

4. The fixed-focus camera module according to claim 2, wherein the top end of the lens base has an outer groove, and the fixed-focus camera module further comprises an optical filtering element, wherein the optical filtering element and the glue layer are disposed in the outer groove.

5. The fixed-focus camera module according to claim 1, further comprising a circuit board, wherein the photosensing component is electrically connected to the circuit board, and the lens base is disposed at the circuit board.

6. The fixed-focus camera module according to claim 5, further comprising an optical filtering element, wherein the optical filtering element is disposed at the photosensing component, and the optical filtering element is kept between the optical lens assembly and the photosensing component.

7. The fixed-focus camera module according to claim 1, further comprising an optical filtering element, wherein the optical filtering element is disposed at the lens base, and the optical filtering element is kept between the optical lens assembly and the photosensing component.

8. The fixed-focus camera module according to claim 7, wherein the optical filtering element is packaged in the lens base, and the optical filtering element is kept between the optical lens assembly and the photosensing component.

9. The fixed-focus camera module according to claim 7, wherein the top end of the lens base has an inner groove, and the optical filtering element is packaged in the inner groove of the lens base.

10. The fixed-focus camera module according to claim 8, wherein the top end of the lens base has an inner groove, and the optical filtering element is packaged in the inner groove of the lens base.

11. The fixed-focus camera module according to claim 1, wherein the optical lens assembly is exposed at an exterior of the lens base.

12. The fixed-focus camera module according to claim 1, wherein the at least two group units are an upper group unit and a lower group unit, and the upper group unit is muff-coupled to the lower group unit.

13. The fixed-focus camera module according to claim 12, wherein the upper group unit comprises an upper bearing body and an extension wall, the lower group unit comprises a lower bearing body, the extension wall extends outward from an exterior of the upper bearing body, and overlaps and joins the lower bearing body of the lower group unit.

14. The fixed-focus camera module according to claim 13, wherein the extension wall forms an annular brim structure.

15. The fixed-focus camera module according to claim 13, wherein the upper bearing body has a lower muff-coupling end portion under the extension wall, and the lower muff-coupling end portion is muff-coupled to the lower bearing body.

16. The fixed-focus camera module according to claim 13, wherein the upper bearing body and the lower bearing body are hollow structures, and a plurality of the lenses are respectively mounted in the upper bearing body and the lower bearing body.

17. The fixed-focus camera module according to claim 1, wherein at least one of the group units is fixed by a bonding medium.

18. The fixed-focus camera module according to claim 17, wherein the bonding medium is selected from a group consisting of one or more of: a UV glue, a thermosetting glue, a UV thermosetting glue, an epoxy glue, a moisture curing glue, and a pressure sensitive adhesive.

19. The fixed-focus camera module according to claim 1, wherein the group units are directly exposed at an exterior of the lens base.

20. The fixed-focus camera module according to claim 1, wherein at least one of the group units is fixed after being directly adjusted.

* * * * *

UNITED STATES PATENT AND TRADEMARK OFFICE
CERTIFICATE OF CORRECTION

PATENT NO. : 10,827,103 B2
APPLICATION NO. : 16/311894
DATED : November 3, 2020
INVENTOR(S) : Zhenyu Chen et al.

Page 1 of 1

It is certified that error appears in the above-identified patent and that said Letters Patent is hereby corrected as shown below:

On the Title Page

Add item (30) Foreign Application Priority Data:
Jun. 23, 2016 (CN) ........................ 2016-10480992.1
Jun. 23, 2016 (CN) ........................ 2016-20650844.5
Jun. 23, 2016 (CN) ........................ 2016-10487305.9
Jun. 23, 2016 (CN) ........................ 2016-20638177.9

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*